United States Patent
Hewlett, II et al.

(10) Patent No.: US 12,407,717 B2
(45) Date of Patent: Sep. 2, 2025

(54) MACHINE LEARNING ARCHITECTURE FOR DETECTING MALICIOUS FILES USING STREAM OF DATA

(71) Applicant: Palo Alto Networks, Inc., Santa Clara, CA (US)

(72) Inventors: William Redington Hewlett, II, Mountain View, CA (US); Sujit Rokka Chhetri, Santa Clara, CA (US); Brody James Kutt, Santa Clara, CA (US); Shan Huang, San Jose, CA (US); Nandini Ramanan, Sunnyvale, CA (US); Sheng Yang, Santa Clara, CA (US); Min Du, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 203 days.

(21) Appl. No.: 18/104,137

(22) Filed: Jan. 31, 2023

(65) Prior Publication Data
US 2024/0259420 A1  Aug. 1, 2024

(51) Int. Cl.
*H04L 29/06* (2006.01)
*H04L 9/40* (2022.01)
*H04L 41/16* (2022.01)

(52) U.S. Cl.
CPC ............ *H04L 63/145* (2013.01); *H04L 41/16* (2013.01)

(58) Field of Classification Search
CPC .............................. H04L 63/145; H04L 41/16
See application file for complete search history.

(56) References Cited

U.S. PATENT DOCUMENTS

| | | |
|---|---|---|
| 10,637,874 B2 | 4/2020 | Zhao |
| 11,188,646 B2 | 11/2021 | Zhao |
| 11,341,242 B2 | 5/2022 | Tseng |
| 11,349,865 B1 | 5/2022 | Satpathy |
| 11,399,288 B2 | 7/2022 | Jochem Sanz |
| 11,522,885 B1* | 12/2022 | Maknickas ........... H04L 63/145 |
| 2009/0138945 A1 | 5/2009 | Savchuk |
| 2017/0163604 A1* | 6/2017 | Dubrovsky ......... H04L 63/1425 |
| 2018/0013772 A1 | 1/2018 | Schmidtler |
| 2018/0150635 A1 | 5/2018 | Melvin |
| 2018/0343271 A1 | 11/2018 | Tenorio |
| 2020/0372150 A1 | 11/2020 | Salem |
| 2021/0073377 A1 | 3/2021 | Coull |
| 2021/0326440 A1 | 10/2021 | Saxe |

(Continued)

OTHER PUBLICATIONS

Yu Shen. Machine Learning and Knowledge-Based Integrated Intrusion Detection Schemes. University of Ottowa, Jul. 6, 2022 (Jul. 6, 2022}, [online], [retrieved on Mar. 12, 2024], Retrieved from the Internet <https://ruor.uottawa.ca/server/api/core/bitstreams/54ff81aa-0e43-478b-883a-eb0ebd106ec2/conlent>, excerpts, especially Abstract; p. 15, 22, 24.

*Primary Examiner* — Evans Desrosiers
(74) *Attorney, Agent, or Firm* — Van Pelt, Yi & James LLP

(57) ABSTRACT

The present application discloses a method, system, and computer system for classifying stream data at an edge device. The method includes obtaining a stream of a file at the edge device, aligning a predetermined amount of data in chunks associated with the stream of the file, processing a plurality of aligned chunks associated with the stream of the file using a machine learning model, and classifying, at the edge device, the file based at least in part on a classification of the plurality of aligned chunks.

27 Claims, 19 Drawing Sheets

(56) References Cited

U.S. PATENT DOCUMENTS

| | | |
|---|---|---|
| 2022/0043836 A1 | 2/2022 | Upadhyay |
| 2022/0138941 A1 | 5/2022 | Yen |
| 2022/0217164 A1 | 7/2022 | Hewlett, II |
| 2023/0105483 A1 | 4/2023 | Rittman |
| 2023/0254326 A1 | 8/2023 | Maknickas |

* cited by examiner

MACHINE LEARNING ARCHITECTURE FOR DETECTING MALICIOUS FILES USING STREAM OF DATA

CROSS REFERENCE TO OTHER APPLICATIONS

Background of the Invention

Nefarious individuals attempt to compromise computer systems in a variety of ways. As one example, such individuals may embed or otherwise include malicious files in email attachments and transmit or cause the malicious files to be transmitted to unsuspecting users. When executed, the malicious files compromise the victim's computer. Some types of malicious files will instruct a compromised computer to communicate with a remote host. For example, malicious files can turn a compromised computer into a "bot" in a "botnet," receiving instructions from and/or reporting data to a command and control (C&C) server under the control of the nefarious individual. One approach to mitigating the damage caused by malicious files is for a security company (or other appropriate entity) to attempt to identify a malicious file and prevent it from reaching/ executing on end user computers. Another approach is to try to prevent compromised computers from communicating with the C&C server. Unfortunately, authors of malicious files are using increasingly sophisticated techniques to obfuscate the workings of their software. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

DETAILED DESCRIPTION

Figure 1:
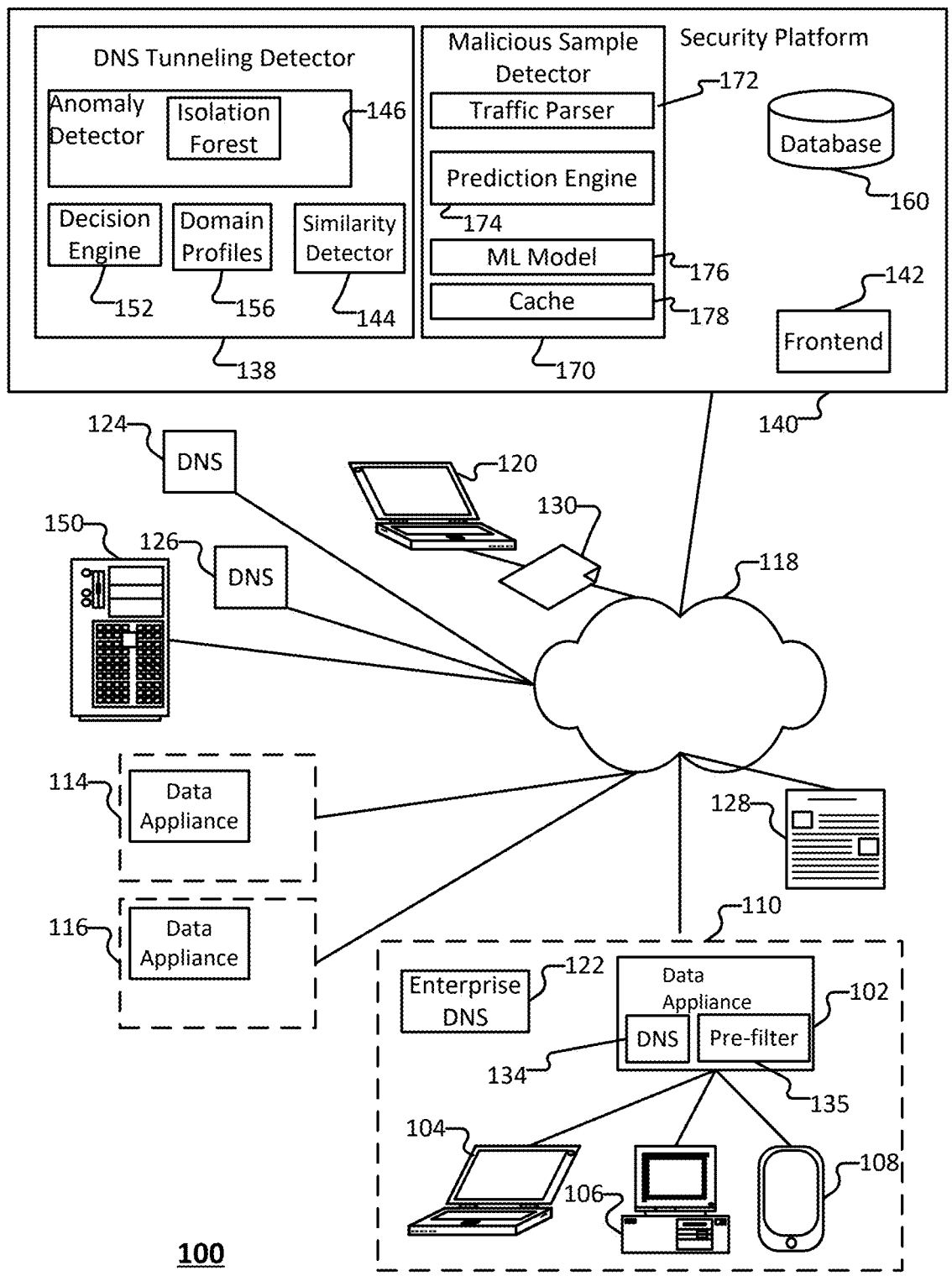
FIG. 1 is a block diagram of an environment in which a malicious traffic is detected or suspected according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, an edge device may include a device (e.g., a hardware system) that controls data flow at the boundary between two networks. As an example, the edge device is a device that provides an entry point into enterprise or service core networks. An example of an edge device includes an inline security entity, such as a firewall. Other examples of edge devices include routers, routing switches, integrated access devices, multiplexers, and wide area network access devices.

As used herein, an inline security entity may include a network node (e.g., a device) that enforces one or more security policies with respect to information such as network traffic, files, etc. As an example, a security entity may be a firewall. As another example, an inline security entity may be implemented as a router, a switch, a DNS resolver, a computer, a tablet, a laptop, a smartphone, etc. Various other devices may be implemented as a security entity. As another example, an inline security entity may be implemented as an application running on a device, such as an anti-malware application. As another example, an inline security entity may be implemented as an application running on a container or virtual machine.

Various embodiments include a system, method, and device for classification of streaming files. In some embodiments, the classification of streaming files includes security processing at an inline security entity. The method includes obtaining a stream of a file at the edge device, processing a set of chunks associated with the stream of the file using a machine learning model, and classifying, at the edge device, the file before processing an entirety of the file.

Various embodiments include a system, method, and device for classification of streaming files. In some embodiments, the classification of streaming files includes security processing at an inline security entity. The method includes obtaining a stream of a file at the edge device, aligning a predetermined amount of data in chunks associated with the stream of the file, processing a plurality of aligned chunks associated with the stream of the file using a machine learning model, and classifying, at the edge device, the file based at least in part on a classification of the plurality of aligned chunks.

Related art systems that classify a file, including streaming files, performs a classification after receiving the entirety of the file. For example, related art systems classify the file by using all (or substantially) all of the file for predicting a classification for the file. The classification of files by related art systems may include performing a feature extraction across the entire file (or substantially the entirety of the file) and querying a model such as a machine learning model to obtain a prediction for the file classification (e.g., a likelihood that the file is malicious, etc.). As an example, related art systems used XGBoost machine learning models to perform classification of non-streaming files at edge devices.

Related art systems are generally not feasible techniques for classifying streaming files because such related art systems need to wait for the whole file to complete the transaction (e.g., to be downloaded) in order for the system to perform feature extraction with respect to the streaming file. Because the related art systems wait for the whole file to be received before performing the classification (e.g., the feature extraction and classifying using a model), related art systems are inefficient and create latency in the consumption of the streaming data in the streaming file. Further, use of related art systems at edge devices is infeasible because of memory constraints. Edge devices are generally unable to store chunks (e.g., packets) of data locally at the edge device, and thus some portion of the streaming file is forwarded to a connected device before the related art system is able to discern a classification of the streaming file, such as whether the streaming file is malicious.

Various embodiments disclose a system, method, and device for performing classification with respect to streaming files at an edge device (e.g., a firewall) and before the entire respective streaming file has been processed at the edge device (e.g., before the entire streaming file has been received). The system may perform the classification of the streaming file based at least in part on one or more chunks of the streaming file. As an example, a chunk may be a predefined number of bytes of data (e.g., 1500 bytes of data). In some embodiments, the system sequentially analyzes each chunk (e.g., contemporaneous with receipt of the chunk), and performs a prediction of the classification for the streaming file before the entire streaming file has been received/processed. The system may perform an active measure with respect to the streaming file in response to a particular classification of a chunk of the streaming file (e.g., if a prediction that the file corresponds to a particular classification exceeds a predefined classification threshold).

In the case of classification in the context of detecting malicious files, the system sequentially processes the chunks and permits the chunks to pass through the system (e.g., to be executed by a device) if the chunk is not indicative of a malicious file (e.g., the file is not classified as malicious based on the chunk), and performs an active measure with respect to further chunks if the chunk is indicative that the streaming file is malicious (e.g., the file is classified as malicious based on the chunk). An example of the active measure may be blocking the remaining chunks of the streaming file to pass through (or be processed by) the edge device.

In some embodiments, the system uses a machine learning model trained using a streamlined deep learning technique to facilitate classification of streaming files at edge devices. The machine learning model is trained to classify files a chunk at a time (e.g., sequentially classifying a predefined number of bytes of data). Because of tight memory constraints at an edge device, storing the entire file is impractical. However, various embodiments save some state information indicative of the state of the streaming file. The information indicative of the state is used to classify a current chunk, and then the system iterates over saving the state information and using such information to classify a next chunk. In some embodiments, the state information corresponds to a result of a max pooling operation performed with respect to a subset of the streaming file (e.g., one or more chunks of the streaming file).

In some cases, profiles of files received at edge devices are non-linear. For example, certain file types have header information comprised in a first chunk (e.g., a first packet). However, in order for the classification of streaming files based on a chunk-level classification (e.g., analysis/prediction using a single chunk at a time until complete) to be deterministic, the classifier (e.g., the machine learning model) needs to always be analyzing the same type of bytes (e.g., bytes comprising non-header information). Various embodiments implement an alignment of chunks of the streaming file in connection with ensuring that the classification is being performed with respect to a same set of bytes.

Various embodiments improve on related art systems because streaming files may be classified at edge devices and may perform the classification before the entire streaming file has been received or processed. Accordingly, various embodiments enable a system to take actions with respect to the streaming file sooner based on the classification of the streaming file before the entire streaming file has been received or processed.

Although embodiments described in connection with the examples illustrated in FIGS. 1-19 are described primarily in the context of the detection of malicious files/traffic (e.g., classifying files as malicious/non-malicious based on analysis of a subset of chunks of the files), various embodiments may be implemented in other contexts for classifying streaming files. Examples of other contexts include, without limitation, classifying the file as including/pertaining to financial information, HIPPA information, Personal Identifying Information (PII), copyright protected material, General Data Protection Regulation (GDPR) data, etc. As an example, various embodiments classify (or predict whether) a streaming file includes copyright protected material based on an analysis of a subset of the chunks of the streaming file (e.g., before an entirety of the streaming file is received or processed).

FIG. 1 is a block diagram of an environment in which a malicious traffic is detected or suspected according to various embodiments. In the example shown, client devices 104-108 are a laptop computer, a desktop computer, and a tablet (respectively) present in an enterprise network 110 (belonging to the "Acme Company"). Data appliance 102 (e.g., an edge device) is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110. For example, data appliance 102 enforces policies with respect to leakage or improper transmission of certain data, such as GDPR data, PII, etc.

In the example shown, data appliance 102 is an inline security entity. However, various other implementations may include a data appliance that is another type of edge device (e.g., a device that does not specifically provide inline security processing). Data appliance 102 performs low-latency processing/analysis of incoming data (e.g., traffic data) and determines whether to offload any processing of the incoming data to a cloud system, such as security platform 140. As an example, data appliance 102 processes streaming files and classifies the streaming files locally. In some embodiments, data appliance 102 classifies streaming files based on a subset of the streaming data before an entirety of the respective streaming files are received/processed. For example, data appliance 102 may perform classification with individual chunks (e.g., packets or pre-defined number of bytes). In connection with performing the classification using individual chunks, data appliance sequentially performs feature extraction with respect to a chunk and classifies the streaming file based at least in part on the feature extraction, and then continues to iteratively perform such analysis on a chunk-by-chunk basis (e.g., in the order in which the chunks are received) until the earlier of (i) the streaming file being classified (e.g., a prediction obtained based on the classification exceeds a predefined threshold such as a predefined maliciousness threshold), and (ii) the streaming file has been fully received or processed. For example, data appliance 102 queries a classifier or model (e.g., a machine learning model) stored locally at data appliance 102 based at least in part on the feature extraction for a particular chunk to obtain a prediction of a classification for the streaming file using the chunk.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security platform 140. Security platform 140 may be a cloud system such as a cloud service security entity. Security platform 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, system 100 uses security platform 140 to perform processing with respect to traffic data off-loaded by data appliance 102, such as to perform processing that includes heavy computations. Security platform 140 provides one or more services to data appliance 102, client device 120, etc. Examples of services provided by security platform 140 (e.g., the cloud service entity) include a data loss prevention (DLP) service, an application cloud engine (ACE) service (e.g., a service for identifying a type of application based on a pattern or fingerprint of traffic), Machine learning Command Control (MLC2) service, an advanced URL filtering (AUF) service, a threat detection service, an enterprise data leak service (e.g., detecting data leaks or identifying sources of leaks), an Internet of Things (IoT) service. Various other service may be implemented.

In some embodiments, system 100 (e.g., malicious sample detector 170, security platform 140, etc.) trains a detection model to detect exploits (e.g., malicious samples), malicious traffic, application identities, or to detect certain types of information (e.g., predefined categories of information such as financial information, GDPR data, PII, etc.). Security platform 140 may store blacklists, whitelists, etc. with respect to data (e.g., mappings of signatures to malicious files, etc.). In response to processing traffic data, security platform 140 may send an update to inline security entities, such as data appliance 102. For example, security platform 140 provides an update to a mapping of signatures to malicious files, an update to a mapping of signatures to benign files, etc.

According to various embodiments, the model(s) trained by system 100 (e.g., security platform 140) is obtained using a machine learning process. Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) is a combined feature vector or set of features vectors and based on the combined feature vector or set of feature vectors the classifier model determines whether the corresponding traffic (e.g., input string) is malicious, or a likelihood that the traffic is malicious (e.g., whether the traffic is exploit traffic).

According to various embodiments, security platform 140 comprises DNS tunneling detector 138 and/or malicious sample detector 170. Malicious sample detector 170 is used in connection with determining whether a sample (e.g., traffic data) is malicious. In response to receiving a sample (e.g., an input string such as an input string input in connection with a log-in attempt, a file, a traffic pattern), malicious sample detector 170 analyzes the sample (e.g., the input string, etc.), and determines whether the sample is malicious. For example, malicious sample detector 170 determines one or more feature vectors for the sample (e.g., a combined feature vector), and uses a model to determine (e.g., predict) whether the sample is malicious. Malicious sample detector 170 determines whether the sample is malicious based at least in part on one or more attributes of the sample. In some embodiments, malicious sample detector 170 receives a sample, performs a feature extraction (e.g., a feature extraction with respect to one or more attributes of the input string), and determines (e.g., predicts) whether the sample (e.g., an SQL or command injection string) is malicious based at least in part on the feature extraction results. For example, malicious sample detector 170 uses a classifier (e.g., a detection model) to determine (e.g., predict) whether the sample is malicious based at least in part on the feature extraction results. In some embodiments, the classifier corresponds to a model (e.g., the detection model) to determine whether a sample is malicious, and the model is trained using a machine learning process.

In some embodiments, malicious sample detector 170 comprises one or more of traffic parser 172, prediction engine 174, ML model 176, and/or cache 178.

Traffic parser 172 is used in connection with determining (e.g., isolating) one or more attributes associated with a sample being analyzed. As an example, in the case of a file, traffic parser 172 can parse/extract information from the file, such as from a header of the file. The information obtained from the file may include libraries, functions, or files invoked/called by the file being analyzed, an order of calls, etc. As another example, in the case of an input string, traffic parser 172 determines sets of alphanumeric characters or values associated with the input string. In some embodiments, traffic parser 172 obtains one or more attributes associated with (e.g., from) the sample. For example, traffic parser 172 obtains from the sample one or more patterns (e.g., a pattern of alphanumeric characters), one or more sets of alphanumeric characters, one or more commands, one or more pointers or links, one or more IP addresses, regex statements, etc.

In some embodiments, one or more feature vectors corresponding to the sample are determined by malicious sample detector 170 (e.g., traffic parser 172 or prediction engine 174). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, traffic parser 172 uses the one or more attributes associated with the sample in connection with determining the one or more feature vectors. In some implementations, traffic parser 172 determines a combined feature vector based at least in part on the one or more feature vectors corresponding to the sample. As an example, a set of one or more feature vectors is determined (e.g., set or defined) based at least in part on the model used to detect exploits. Malicious sample detector 170 can use the set of one or more feature vectors to determine the one or more attributes of patterns that are to be used in connection with training or implementing the model (e.g., attributes for which fields are to be populated in the feature vector, etc.). The model may be trained using a set of features that are obtained based at least in part on sample malicious traffic, such as a set of features corresponding to predefined regex statements and/or a set of feature vectors determined based on an algorithmic-based feature extraction. For example, the model is determined based at least in part on performing a malicious feature extraction in connection with generating (e.g., training) a model to detect exploits. The malicious feature extraction can include one or more of (i) using predefined regex statements to obtain specific features from files, or SQL and command injection strings, and (ii) using an algorithmic-based feature extraction to filter out described features from a set of raw input data.

In response to receiving a sample for which malicious sample detector 170 is to determine whether the sample is malicious (or a likelihood that the sample is malicious), malicious sample detector 170 determines the one or more feature vectors (e.g., individual feature vectors corresponding to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, malicious sample detector 170 (e.g., traffic parser 172) provides (or makes accessible) the one or more feature vectors to prediction engine 174 (e.g., in connection with obtaining a prediction of whether the sample is malicious). As another example, malicious sample detector 170 (e.g., traffic parser 172) stores the one or more feature vectors such as in cache 178 or database 160.

In some embodiments, prediction engine 174 determines whether the sample is malicious based at least in part on one or more of (i) a mapping of samples to indications of whether the corresponding samples are malicious, (ii) a mapping of an identifier for a sample (e.g., a hash or other signature associated with the sample) to indications of whether the corresponding sample are malicious, and/or (iii) a classifier (e.g., a model trained using a machine learning process). In some embodiments, determining whether the sample (e.g., based on a mapping of identifiers to indications that the sample is malicious) may be performed at data appliance 102, and for a sample for which an associated identifier is not stored in the mapping(s), data appliance 102 offloads processing of the sample to security platform 140.

Prediction engine 174 is used to predict whether a sample is malicious. In some embodiments, prediction engine 174 determines (e.g., predicts) whether a received sample is malicious. Prediction engine 174 determines whether a newly received sample is malicious based at least in part on characteristics/attributes pertaining to the sample (e.g., regex statements, information obtained from a file header, calls to libraries, APIs, etc.). For example, prediction engine 174 applies a machine learning model to determine whether the newly received sample is malicious. Applying the machine learning model to determine whether the sample is malicious may include prediction engine 174 querying machine learning model 176 (e.g., with information pertaining to the sample, one or more feature vectors, etc.). In some implementations, machine learning model 176 is pre-trained and prediction engine 174 does not need to provide a set of training data (e.g., sample malicious traffic and/or sample benign traffic) to machine learning model 176 contemporaneous with a query for an indication/determination of whether a particular sample is malicious. In some embodiments, prediction engine 174 receives information associated with whether the sample is malicious (e.g., an indication that the sample is malicious). For example, prediction engine 174 receives a result of a determination or analysis by machine learning model 176. In some embodiments, prediction engine 174 receives from machine learning model 176, an indication of a likelihood that the sample is malicious. In response to receiving the indication of the likelihood that the sample is malicious, prediction engine 174 determines (e.g., predicts) whether the sample is malicious based at least in part on the likelihood that the sample is malicious. For example, prediction engine 174 compares the likelihood that the sample is malicious to a likelihood threshold value (e.g., a predetermined maliciousness threshold). In response to a determination that the likelihood that the sample is malicious is greater than a likelihood threshold value, prediction engine 174 may deem (e.g., determine that) the sample to be malicious. Conversely, in response to determining that the sample is malicious is greater than a likelihood threshold value, prediction engine 174 may deem (e.g., determine that) the sample is benign (e.g., non-malicious).

According to various embodiments, in response to prediction engine 174 determining that the received sample is malicious, security platform 140 sends to a security entity (e.g., data appliance 102) an indication that the sample is malicious. For example, malicious sample detector 170 may send to an inline security entity (e.g., a firewall) or network node (e.g., a client) an indication that the sample is malicious. The indication that the sample is malicious may correspond to an update to a blacklist of samples (e.g., corresponding to malicious samples) such as in the case that the received sample is deemed to be malicious, or an update to a whitelist of samples (e.g., corresponding to non-malicious samples) such as in the case that the received sample is deemed to be benign. In some embodiments, malicious sample detector 170 sends a hash or signature corresponding to the sample in connection with the indication that the sample is malicious or benign. The security entity or endpoint may compute a hash or signature for a sample and perform a look up against a mapping of hashes/signatures to indications of whether samples are malicious/benign (e.g., query a whitelist and/or a blacklist). In some embodiments, the hash or signature uniquely identifies the sample.

Prediction engine 174 is used in connection with determining whether the sample (e.g., an input string) is malicious (e.g., determining a likelihood or prediction of whether the sample is malicious). Prediction engine 174 uses information pertaining to the sample (e.g., one or more attributes, patterns, etc.) in connection with determining whether the corresponding sample is malicious.

In response to receiving a sample to be analyzed, malicious sample detector 170 can determine whether the sample corresponds to a previously analyzed sample (e.g., whether the sample matches a sample associated with historical information for which a maliciousness determination has been previously computed). As an example, malicious sample detector 170 determines whether an identifier or representative information corresponding to the sample is comprised in the historical information (e.g., a blacklist, a whitelist, etc.). In some embodiments, representative information corresponding to the sample is a hash or signature of the sample. In some embodiments, malicious sample detector 170 (e.g., prediction engine 174) determines whether information pertaining to a particular sample is comprised in a dataset of historical input strings and historical information associated with the historical dataset indicating whether a particular sample is malicious (e.g., a third-party service such as VirusTotal™). In response to determining that information pertaining to a particular sample is not comprised in, or available in, the dataset of historical input strings and historical information, malicious sample detector 170 may deem the sample has not yet been analyzed and malicious sample detector 170 can invoke an analysis (e.g., a dynamic analysis) of the sample in connection with determining (e.g., predicting) whether the sample is malicious (e.g., malicious sample detector 170 can query a classifier based on the sample in connection with determining whether the sample is malicious). An example of the historical information associated with the historical samples indicating whether a particular sample is malicious corresponds to a VirusTotal® (VT) score. In the case of a VT score greater than 0 for a particular sample, the particular sample is deemed malicious by the third-party service. In some embodiments, the historical information associated with the historical samples indicating whether a particular sample is malicious corresponds to a social score such as a community-based score or rating (e.g., a reputation score) indicating that a sample is malicious or likely to be malicious. The historical information (e.g., from a third-party service, a community-based score, etc.) indicates whether other vendors or cyber security organizations deem the particular sample to be malicious.

In some embodiments, malicious sample detector 170 (e.g., prediction engine 174) determines that a received sample is newly analyzed (e.g., that the sample is not within the historical information/dataset, is not on a whitelist or blacklist, etc.). Malicious sample detector 170 (e.g., traffic parser 172) may detect that a sample is newly analyzed in response to security platform 140 receiving the sample from a security entity (e.g., a firewall) or endpoint within a network. For example, malicious sample detector 170 determines that a sample is newly analyzed contemporaneous with receipt of the sample by security platform 140 or malicious sample detector 170. As another example, malicious sample detector 170 (e.g., prediction engine 174) determines that a sample is newly analyzed according to a predefined schedule (e.g., daily, weekly, monthly, etc.), such as in connection with a batch process. In response to determining that a sample that is received that has not yet been analyzed with respect to whether such sample is malicious (e.g., the system does not comprise historical information with respect to such input string), malicious sample detector 170 determines whether to use an analysis (e.g., dynamic analysis) of the sample (e.g., to query a classifier to analyze the sample or one or more feature vectors associated with the sample, etc.) in connection with determining whether the sample is malicious, and malicious sample detector 170 uses a classifier with respect to a set of feature vectors or a combined feature vector associated with characteristics or relationships of attributes or characteristics in the sample.

Machine learning model 176 predicts whether a sample (e.g., a newly received sample) is malicious based at least in part on a model. As an example, the model is pre-stored and/or pre-trained. The model can be trained using various machine learning processes. According to various embodiments, machine learning model 176 uses a relationship and/or pattern of attributes, characteristics, relationships among attributes or characteristics for the sample and/or a training set to estimate whether the sample is malicious, such as to predict a likelihood that the sample is malicious. For example, machine learning model 176 uses a machine learning process to analyze a set of relationships between an indication of whether a sample is malicious (or benign), and one or more attributes pertaining to the sample and uses the set of relationships to generate a prediction model for predicting whether a particular sample is malicious. In some embodiments, in response to predicting that a particular sample is malicious, an association between the sample and the indication that the sample is malicious is stored such as at malicious sample detector 170 (e.g., cache 178). In some embodiments, in response to predicting a likelihood that a particular sample is malicious, an association between the sample and the likelihood that the sample is malicious is stored such as at malicious sample detector 170 (e.g., cache 178). Machine learning model 176 may provide the indication of whether a sample is malicious, or a likelihood that the sample is malicious, to prediction engine 174. In some implementations, machine learning model 176 provides prediction engine 174 with an indication that the analysis by machine learning model 176 is complete and that the corresponding result (e.g., the prediction result) is stored in cache 178.

Cache 178 stores information pertaining to a sample (e.g., an input string). In some embodiments, cache 178 stores mappings of indications of whether an input string is malicious (or likely malicious) to particular input strings, or mappings of indications of whether a sample is malicious (or likely malicious) to hashes or signatures corresponding to samples. Cache 178 may store additional information pertaining to a set of samples such as attributes of the samples, hashes or signatures corresponding to a sample in the set of samples, other unique identifiers corresponding to a sample in the set of samples, etc. In some embodiments, inline security entities, such as data appliance 102, store a cache that corresponds to, or is similar to, cache 178. For example, the inline security entities may use the local caches to perform inline processing of traffic data, such as low-latency processing.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache or otherwise that certain detected network traffic is to be further analyzed (e.g., using a finer detection model) such as by offloading processing to security platform 140.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into data appliance 102 (as shown in FIG. 1) and can also operate as a standalone appliance in various embodiments. And, as with other components shown in FIG. 1, DNS module 134 can be provided by the same entity that provides data appliance 102 (or security platform 140) and can also be provided by a third party (e.g., one that is different from the provider of data appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138 such as decision engine 152 of DNS tunnelling detector 138) whether the queried domain indicates a malicious DNS tunneling attempt and provide a result back to DNS module 134 (e.g., "malicious DNS tunneling" or "non-tunneling").

In various embodiments, when a client device (e.g., client device 104) attempts to resolve an SQL statement or SQL command, or other command injection string, data appliance 102 uses the corresponding sample (e.g., an input string) as a query to a local cache and/or security platform 140. This query can be performed concurrently with resolution of the SQL statement, SQL command, or other command injection string. As one example, data appliance 102 sends a query (e.g., in the JSON format) to a frontend 142 of security platform 140 via a REST API. As another example, data appliance 102 sends the query to security platform 140 (e.g., a frontend 142 of security platform 140) directly from a data plane of data appliance 102. For example, a process running on data appliance 102 (e.g., a daemon, such as the WIFClient, running on the data plane to facilitate offloading of processing data) communicates the query (e.g., request message) to security platform 140 without the query being first communicated to the message plane of data appliance 102, which in turn would communicate the query to security platform 140. For example, data appliance 102 is configured to use a process running on a data plane to query security platform 140 without mediation via a management plane of data appliance 102. Using processing described in more detail below, security platform 140 will determine (e.g., using malicious sample detector 170) whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. This query can be performed contemporaneously with receipt of the file or input string, or in response to a request from a user to scan the file. As one example, data appliance 102 can send a query (e.g., in the JSON format) to a frontend 142 of security platform 140 via a REST API. The query can be communicated to security platform by a process/connector implemented on a data plane of data appliance 102. Using processing described in more detail below, security platform 140 will determine (e.g., using a malicious file detector that may be similar to malicious sample detector 170 such as by using a machine learning model to detect/predict whether the file is malicious) whether the queried file is a malicious file (or likely to be a malicious file) and provide a result back to data appliance 102 (e.g., "malicious file" or "benign file").

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that is similar to the detected root domains.

As data appliance 102 receives DNS queries (e.g., from DNS module 134), data appliance 102 provides them to security platform 140 which performs both anomaly detection and similarity detection, respectively. In various embodiments, a domain (e.g., as provided in a query received by security platform 140) is classified as a malicious DNS tunneling root domain if either detector flags the domain.

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains. In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]. Each root domain (e.g., foo.com or baddomain.com) is modeled using a set of characteristics unique to malicious DNS tunneling, so that even though benign DNS patterns are diverse (e.g., k2jh3i8y35.legitimatesite.com, xxx888222000444.otherlegitimatesite.com), such DNS patterns are highly unlikely to be misclassified as malicious tunneling. The following are example characteristics that can be extracted as features (e.g., into a feature vector) for a given group of domains (i.e., sharing a root domain).

In some embodiments, malicious sample detector 170 provides to a security entity, such as data appliance 102, an indication whether a sample is malicious. For example, in response to determining that the sample is malicious, malicious sample detector 170 sends an indication that the sample is malicious to data appliance 102, and the data appliance may in turn enforce one or more security policies based at least in part on the indication that the sample is malicious. The one or more security policies may include isolating/quarantining the input string or file, deleting the sample, ensuring that the sample is not executed or resolved, alerting or prompting the user of the maliciousness of the sample prior to the user opening/executing the sample, etc. As another example, in response to determining that the sample is malicious, malicious sample detector 170 provides to the security entity an update of a mapping of samples (or hashes, signatures, or other unique identifiers corresponding to samples) to indications of whether a corresponding sample is malicious, or an update to a blacklist for malicious samples (e.g., identifying samples) or a whitelist for benign samples (e.g., identifying samples that are not deemed malicious).

In some embodiments, one or more feature vectors corresponding to the sample, such as a file, an input string, etc., are determined by system 100 (e.g., security platform 140, malicious sample detector 170, pre-filter 135, etc.). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, system 100 uses features associated with classifier of malicious sample detector 170 (e.g., machine learning model 176 such as the detection model, etc.) the one or more attributes associated with the sample in connection with determining the one or more feature vectors. In some implementations, pre-filter 135 determines a combined feature vector based at least in part on the one or more feature vectors corresponding to the sample. As an example, a set of one or more feature vectors is determined (e.g., set or defined) based at least in part on the pre-filter model (e.g., based on the pre-filter features). System 100 (e.g., pre-filter 135) can use the set of one or more feature vectors to determine the one or more attributes of patterns that are to be used in connection with training or implementing the model (e.g., attributes for which fields are to be populated in the feature vector, etc.). The pre-filter model may be trained using a set of features that are obtained based at least in part on the set of features used in connection with obtaining the detection model.

According to various embodiments, an edge device (e.g., an inline security entity such as data appliance 102) receives traffic data, such as a file, and classifies the traffic data locally. The edge device may use a local classifier (e.g., a machine learning model) stored in cache, etc. For example, the edge device locally performs feature extraction with respect to a file, or a subset of the file, and uses the local classifier to classify the file based on such feature extraction. In some embodiments, the edge device receives a stream of data (e.g., a streaming file) and classifies the stream of data locally based on an analysis of at least a subset of the stream of data (e.g., one or more chunks of the streaming file). As an example, the edge device iteratively obtains a chunk of the streaming data and predicts whether the streaming data (e.g., the streaming file) is malicious based at least in part on the chunk. The edge device may perform feature extraction with respect to the chunk, query the local classifier based on the results from the feature extraction (e.g., using one or more feature vectors obtained from the feature extraction), and obtain a prediction of a classification of the streaming data from the local classifier. As an example, in the case of a security analysis, the prediction may correspond to a likelihood that the streaming data is malicious. The edge device may compare the prediction of the classification of the streaming data to a corresponding likelihood threshold value for such a classification (e.g., a predetermined maliciousness threshold in the case of an assessment of whether the streaming data is malicious). In response to comparing the prediction of the classification to the corresponding likelihood threshold value (e.g., a threshold value for GDPR classification, a threshold value for PII classification, a threshold value for financial information classification, etc.), the edge device may deem the streaming data to correspond to the classification if the prediction of the classification exceeds the likelihood threshold value, or conversely, deem the streaming data to not correspond to the classification if the prediction of the classification is less than (or equal to) the likelihood threshold value. The edge device may then treat the streaming data according to the classification or other traffic, as applicable.

As an illustrative example in the case of a security analysis performed with respect to the streaming data, if the prediction of whether the streaming data is malicious exceeds the likelihood threshold value, the edge device may deem the streaming data to be malicious. Conversely, if the prediction of whether the streaming data is malicious is less than (or equal to) the likelihood threshold value, the edge device may deem the streaming data to be non-malicious (e.g., benign). In response to determining (e.g., predicting) a classification of the streaming data, the edge device may implement/enforce an applicable policy.

According to various embodiments, the edge device performs a classification of the streaming data (e.g., a streaming file) before the entire set of streaming data (e.g., an entire streaming file) has been processed/received at the edge device. Referring to FIG. 1, data appliance 102 receives traffic data, such as streaming data. In response to receiving traffic data, data appliance 102 may perform a classification of the traffic data. For example, data appliance performs the classification of the streaming file based at least in part on one or more chunks of the streaming file. As an example, a chunk may be a predefined number of bytes of data (e.g., 1500 bytes of data). Data appliance 102 may sequentially analyze a set (or subset) of chunks of the streaming file (e.g., contemporaneous with receipt of the chunk), and performs a prediction of the classification for the streaming file before the entire streaming file has been received/processed by data appliance 102. In response to the classifying the streaming file, data appliance may enforce (e.g., on a chunk-by-chunk basis as each chunk is sequentially analyzed for classification) a policy for handling the streaming data. An example of enforcing a policy includes performing an active measure with respect to the streaming file in response to a particular classification of a chunk of the streaming file (e.g., if a prediction that the file corresponds to a particular classification exceeds a predefined classification threshold, such as in response that a prediction indicates that the streaming data is malicious).

Data appliance 102 stores the classifier (e.g., the machine learning model) used to locally classify traffic data, such as a streaming file. The classifier may be trained by a remote server, such as security platform 140, and provided to data appliance 102 for inline classification. Further, the classifier may be updated or retrained by the remote server, and data appliance 102 is provided with the updated classifier.

In some embodiments, profiles of traffic data/files received at edge devices, such as data appliance 102, are non-linear. A streaming file received at the edge device generally comprises header information, at least in the first chunk or packet of data. The header information skews the other data comprised in the streaming file. For example, the header information corresponds to an offset by which substantive information in the streaming file are shifted. To ensure that the classification of the streaming file using a chunk (e.g., classifying the streaming file on a chunk-by-chunk basis) is deterministic, various embodiments implement an alignment of information comprised in the chunk. For example, data appliance 102 aligns the information comprised in chunks to ensure data appliance 102 (e.g., by using the classifier) analyzes the same type of bytes (e.g., substantive information, or bytes comprising non-header information, rather than header information). In connection with performing the alignment of information comprised in the chunk, data appliance 102 obtains a second set of data from a first chunk (e.g., a last X bytes of the first chunk) and a first set of data from a second chunk (e.g., a first Y bytes of the second chunk), deems the second set of data from the first chunk and the first set of data from the second chunk as data for a single particular chunk, and classifies the streaming file using the second set of data from the first chunk and the first set of data from the second chunk (e.g., using the single particular chunk). X and Y may be positive integers that are predefined. In some embodiments, data appliance 102 stores a mapping of file types to values of X and Y, and in response to beginning to receive a streaming file, data appliance 102 determines the file type for the streaming file and obtains the corresponding X and Y values. Data appliance 102 then uses the X and Y values to align chunk data in the set of chunks of the streaming file (e.g., to account for the header information).

In connection with performing classification of a streaming file based on a chunk (e.g., chunk data), data appliance 102 obtains a prediction for a classification of the streaming file. The prediction may correspond to a likelihood that the streaming file corresponds to a particular classification (e.g., a likelihood that the streaming file is malicious). In various embodiments, data appliance 102 compares the prediction for the classification to a predefined classification threshold and determines whether to deem the streaming file in accordance with the predicted classification based on a result of the comparison. For example, if a likelihood that the streaming file is malicious is greater than the predefined maliciousness threshold, data appliance 102 deems the streaming file to be malicious and handles the traffic data (e.g., the streaming file) accordingly. According to various embodiments, as data appliance 102 obtains a prediction with respect to the streaming file based on the applicable chunk data, data appliance 102 handles the streaming data in accordance with the predicted classification. In the event that a prediction for a classification of the chunk indicates (e.g., is deemed to indicate based on the prediction satisfying a predefined threshold value) that the streaming file corresponds to a particular classification (e.g., a predefined classification such as malicious, PII, financial data, GDPR data, etc.) data appliance 102 handles the remaining of the streaming file in accordance with the classification. For example, in the case of security processing at data appliance 102, upon the first chunk having a predicted classification that satisfies the predefined maliciousness threshold, data appliance 102 handles the streaming file as malicious (e.g., handles the current chunk and all future chunks of the streaming file as malicious).

In some embodiments, data appliance 102 uses a dynamic classification threshold in connection with classifying traffic data using a chunk. For example, a chunk received earlier (e.g., at the beginning of the streaming data) may be classified using a first classification threshold, and a chunk received later (e.g., at the end of the streaming file) may be classified using a second classification threshold. The first classification threshold and the second classification threshold are different. In some implementations, the first classification threshold is higher than the second classification threshold. For example, data appliance 102 brings down the classification threshold (e.g., the maliciousness threshold) as more and more data of the streaming file is processed. The various classification thresholds or the change to the dynamic classification threshold may be set based on empirically testing classification of the streaming file. Data appliance 102 may store a mapping of a number (or percentile in relation to a total number of chunks) of a particular chunk in the set of chunks to an applicable classification threshold to be used when classifying the particular chunk. As an example, the predefined malicious threshold is lower for a first chunk than for a jth chunk, and j is a positive integer greater than 1.

Figure 2:
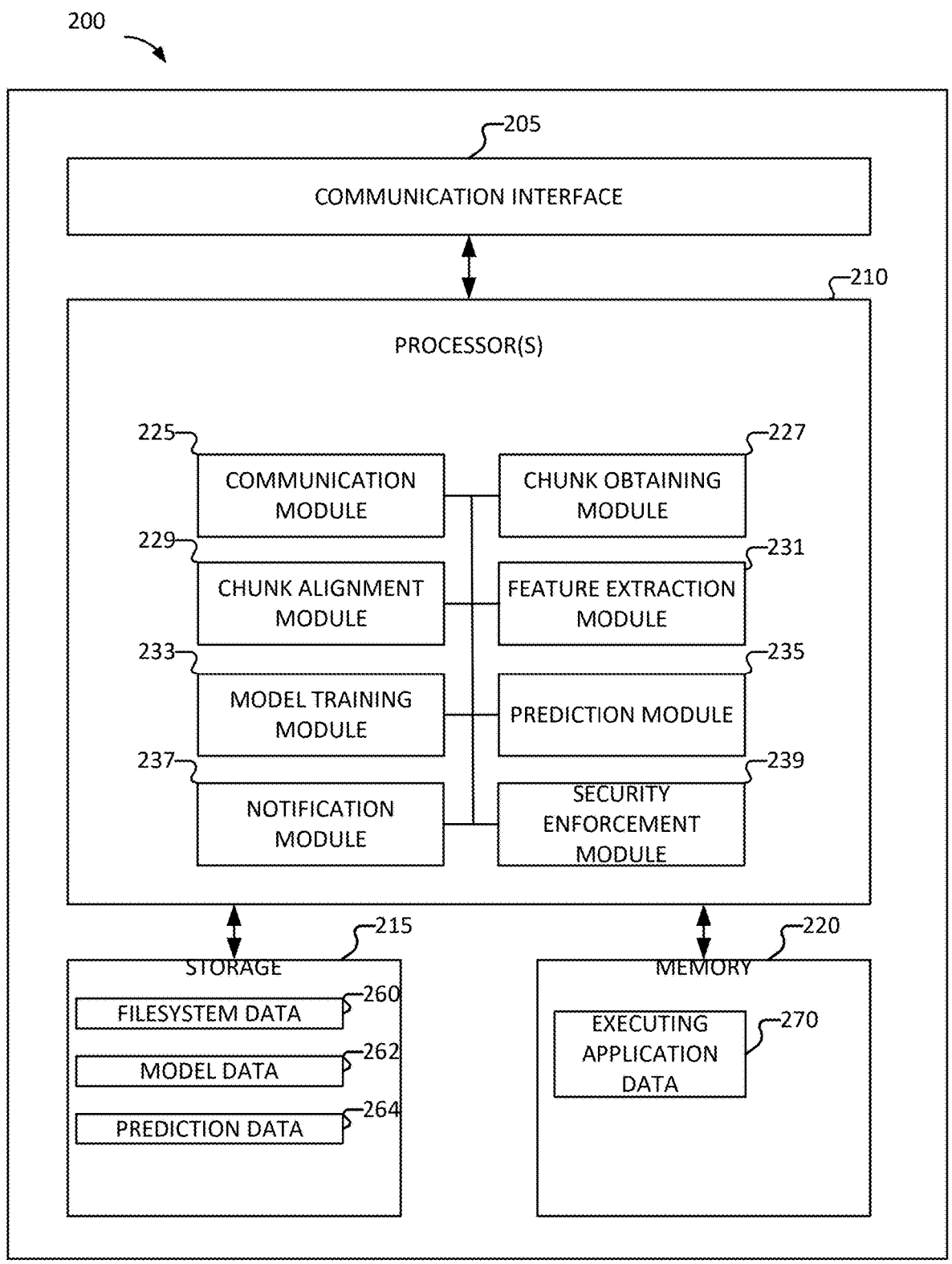
FIG. 2 is a block diagram of a system to classify a file according to various embodiments.

FIG. 2 is a block diagram of a system to classify a file according to various embodiments. In some embodiments, system 200 is implemented at least in part by system 100 of FIG. 1. System 200 may be implemented by an inline security entity. In various embodiments, system 200 is implemented in connection with system 400 of FIG. 4, system 500 of FIG. 5, system 1300 of FIG. 13, and/or system 1400 of FIG. 14. In various embodiments, system 200 is implemented in connection with process 300 of FIG. 3, process 700 of FIG. 7, process 800 of FIG. 8, process 900 of FIG. 9, process 1000 of FIG. 10, and/or process 1100 of FIG. 11, process 1600 of FIG. 16, process 17 of FIG. 17, process 1800 of FIG. 18, and/or process 1900 of FIG. 19. System 200 may be implemented in one or more servers, a security entity such as a firewall, and/or an endpoint.

System 200 can be implemented by one or more devices such as servers. System 200 can be implemented at various locations on a network. In some embodiments, system 200 implements data appliance 102 of system 100 of FIG. 1. As an example, system 200 is deployed as an edge device, such as a firewall or inline security entity that performs inline security processing with respect to traffic data (e.g., system 200 determines whether a file is malicious, and handles the traffic data according to such maliciousness classification a service). The file classification may be implemented in connection with a locally stored classifier, such as a machine learning model. System 200 may receive the classifier from a server and store the classifier locally in its cache for use in inline file classification/processing.

According to various embodiments, in response to receiving traffic data to be analyzed (e.g., classified, such as determining whether the file is malicious), system 200 performs feature extraction with respect to the streaming file (e.g., performs feature extraction for a particular chunk of data in the streaming file) and uses the classifier to classify the streaming file based on the results (e.g., the feature vector) obtained from the feature extraction. System 200 handles the traffic data (e.g., the streaming file) in accordance with the classification of the streaming file. System 200 iteratively performs the feature extraction for a chunk in a sequence of chunks received/processed from the set of chunks of the streaming file, and classifies the streaming file using the corresponding results from the feature extraction. For example, system 200 sequentially receives chunks for a streaming file and system 200 and sequentially performs a classification of the streaming file using a particular chunk of data of the streaming data (e.g., the chunks are processed and classification is performed using a chunk in an order in which chunks are received).

In the example shown, system 200 implements one or more modules in connection with classifying a file, such as a streaming file (e.g., predicting a classification), malicious, determining a likelihood that the file corresponds to a particular classification, and/or providing a notice or indication of whether a file is malicious or performing an active measure in response to determining that the file classification matches a predefined classification (e.g., in response to determining that a maliciousness prediction exceeds a predefined maliciousness threshold). System 200 comprises communication interface 205, one or more processors 210, storage 215, and/or memory 220. One or more processors 210 comprises one or more of communication module 225, chunk obtaining module 227, chunk alignment module 229, feature extraction module 231, model training module 233, prediction module 235, notification module, 237, and security enforcement module 239.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated. As another example, communication interface 205 provides to communication module 225 information received by system 200. Communication module 225 is configured to receive files to be analyzed, such as from network endpoints or nodes such as security entities (e.g., firewalls), etc. Communication module 225 is configured to query third party service(s) for information pertaining to files (e.g., services that expose information for files such as a third-party score or assessments of maliciousness of files, a community-based score, assessment, or reputation pertaining to files, a blacklist for files, and/or a whitelist for files, etc.). Communication module 225 is configured to receive one or more settings or configurations from an administrator. Examples of the one or more settings or configurations include configurations of a process determining whether a file is malicious, configurations pertaining to the classifier or machine learning model to classify files, predefined classification threshold(s) (e.g., a predefined maliciousness threshold, a predefined financial data threshold, etc.), a setting pertaining to header information for a file or file types (e.g., header information/characteristics for various types of streaming files), a format or process according to which a combined feature vector is to be determined, a set of feature vectors to be provided to a classifier for classifying the file, (e.g., determining whether the file is malicious), information pertaining to a whitelist of files (e.g., files that are not deemed suspicious and for which traffic or attachments are permitted), information pertaining to a blacklist of files (e.g., files that are deemed suspicious and for which traffic or attachments are to be restricted).

In some embodiments, system 200 comprises chunk obtaining module 227. System 200 uses chunk obtaining module 227 to receive traffic data, such as streaming files. Chunk obtaining module 227 determines and/or obtains chunks that system 200 receives (e.g., in connection with monitoring network traffic). As an example, a chunk may be a predefined number of bytes of data (e.g., 1500 bytes of data). Chunk obtaining module 227 may use a particular chunk definition (e.g., predefined number of bytes) for all file types, or chunk obtaining module 227 may use different chunk definitions based on a file type. For example, system 200 stores a mapping of file types to chunk definitions (e.g., number of bytes deemed to be a chunk), and chunk obtaining module 227 queries the mapping of file types to chunk definitions to determine a chunk definition to use for a particular file type. Chunk obtaining module 227 obtains a set of chunks corresponding to a streaming file, and the chunks in the set of chunks may be received sequentially (e.g., in the order in which the chunks are arranged in the streaming file) or may be properly sequenced by chunk obtaining module 227 before processing. In response to receiving/processing a chunk, chunk obtaining module 227 provides the chunk to feature extraction module 231 for analysis and classification. In some embodiments, in context in which the profiles of streaming data are non-linear and the streaming file being received by system 200 comprises header information in a first chunk or otherwise a misaligned/non-aligned chunk, chunk obtaining module 227 provides the chunk data (e.g., one or more chunks of the streaming file) to chunk alignment module 229 for chunk alignment before classification.

In some embodiments, system 200 comprises chunk alignment module 229. System 200 uses chunk alignment module 229 to perform alignment of chunk data in a set of chunks for a streaming file. The chunk data is aligned to ensure that classification of the various chunks is deterministic. Chunk alignment module 229 aligns the chunk data to account for header information comprised in a first chunk or another mis-alignment of chunk data with respect to chunks. As an example, a chunk may be a predefined number of bytes of data (e.g., 1500 bytes of data). The predetermined number of bytes may be configurable such as by an administrator (e.g., the predetermined number of bytes may be preset in a policy such as a chunking policy or a file classification policy).

In some embodiments, chunk alignment module 229 aligns the chunk data of a plurality of chunks to ensure that a same type of data (e.g., non-header information) is being analyzed during classification of the streaming file. Chunk alignment module 229 aligns the chunk data of the plurality of chunks by deeming a subset of data of each of two consecutive chunks as chunk data for a single chunk for which classification is to be performed. Chunk alignment module 229 may align the chunk data of the plurality of chunks by obtaining a first predetermined number of bytes from a first chunk and a second predetermined number of bytes from a second chunk (e.g., a chunk immediately subsequent to the first chunk in the streaming file) and deem the collective data of the first predetermined number of bytes and the second predetermined number of bytes as a single chunk to be used in the classification of the streaming file. For example, in the case that a chunk is set as 1500 bytes and the first chunk of a streaming file comprises 500 bytes of header information, chunk alignment module 229 uses the last 1000 bytes of the first chunk and the first 500 bytes of the second chunk and deems such data to correspond to a single chunk of data. The first predetermined number of bytes and the second predetermined number of bytes may be configurable. In some embodiments, the first predetermined number of bytes is determined based on a number of bytes comprised in the header information for the streaming file. Aligning chunks enables the system to analyze (e.g., run a machine learning model against) a same number of bytes in connection with classifying the streaming file based on a chunk.

In some embodiments, system 200 comprises feature extraction module 231. System 200 uses feature extraction module 231 to perform feature extraction with respect to a particular chunk. For example, feature extraction module 231 performs feature extraction on a chunk obtained by chunk obtaining module 227. As another example, such as a case in which the streaming file has predetermined header information, feature extraction module 231 performs feature extraction with respect to an aligned chunk (e.g., chunk data deemed to be a chunk by chunk alignment module 229 such as based on information obtained from successive chunks).

In some embodiments, system 200 uses feature extraction module 231 to determine a set of feature vectors or a combined feature vector to use in connection with classifying a sample, such as determining whether a sample (e.g., the streaming file) is malicious (e.g., using a detection model). In some embodiments, determines a set of one or more feature vectors based at least in part on information pertaining to the sample. For example, feature extraction module 231 determines feature vectors for (e.g., characterizing) the one or more of (i) a set of regex statements (e.g., predefined regex statements), and/or (ii) one or more characteristics or relationships determined based on an algorithmic-based feature extraction.

In some embodiments, system 200 (e.g., prediction module 235) uses a combined feature vector in connection with determining whether a sample is malicious or suspicious, or to otherwise filter (e.g., remove) benign traffic. In some embodiments, system 200 (e.g., prediction module 235) uses a combined feature vector in connection with classifying a streaming file (e.g., determining whether the file is malicious, or another classification such as GDPR data, financial data, export-controlled data, etc.). Feature extraction module 231 may determine such combined feature vector(s). The combined feature vector is determined based at least in part on the set of one or more feature vectors (e.g., based on the set of features for the model, such as a set of detection features in a model for determining whether a sample is malicious). For example, the combined feature vector is determined based at least in part on a set of feature vectors for the predefined set of regex statements, and a set of feature vectors for the characteristics or relationships determined based on an algorithmic-based feature extraction. Feature extraction module 231 determines the combined feature vector by concatenating the set of feature vectors for the predefined set of regex statements and/or the set of feature vectors for the characteristics or relationships determined based on an algorithmic-based feature extraction. Feature extraction module 231 concatenates the set of feature vectors according to a predefined process (e.g., predefined order, etc.).

In some embodiments, system 200 comprises model training module 233. System 200 uses model training module 233 to determine a model (e.g., a classifier) for classifying the streaming file. Model training module 233 may determine a plurality of models for classifying files along different vectors, such as classifying whether (i) the file is malicious, (ii) the file comprises financial information, (iii) the file comprises PII information, (iv) the file comprises GDPR data, (v) the file comprises export control data, (vi) the file comprises another type of characteristic according to which a handling policy may apply, etc. Model training module 233 may determine relationships (e.g., features) between characteristics of a file (e.g., a streaming file) and a particular classification, such as characteristics of the file and the maliciousness of the file (or likelihood that the file is malicious). Examples of machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, model training module 233 trains an XGBoost machine learning classifier model. Inputs to the classifier (e.g., the XGBoost machine learning classifier model) are a combined feature vector or set of feature vectors and based on the combined feature vector, or set of feature vectors, the classifier model determines whether the corresponding .NET file is malicious, or a likelihood that the .NET file is malicious.

In some embodiments, the model(s) implemented by system 200 for classifying a streaming file is trained by a server. System 200 may use model training module 231 to obtain the model from a server. For example, model training module 233 may communicate with the server to determine whether a particular model is available or whether a particular model is updated. Model training module 233 may query the server according to a preset frequency or otherwise in accordance with a model training/updating policy that may be configurable such as by an administrator.

In some embodiments, system 200 comprises prediction module 235. System 200 uses prediction module 235 to predict a classification of a file. As an example, prediction module 235 predicts whether a streaming file corresponds to a particular classification (e.g., malicious, PII, financial data, export-controlled data, GDPR data, etc.). Predicting a particular classification of the file may include predicting a likelihood that the file corresponds to a particular classification, comparing the predicted likelihood to a predefined classification threshold, and determining whether the file corresponds to the particular classification based on the comparison. For example, in the event that the predicted likelihood exceeds the predefined classification threshold, prediction module 235 deems the file to correspond to the particular classification. As another example, in the event that the predicted likelihood does not exceed the predefined classification (e.g., is less than or equal to), prediction module 235 deems the file to not correspond to the particular classification.

Prediction module 235 uses a model such as a machine learning model trained (or obtained from a server) by model training module 233 in connection with determining whether a corresponds to a particular classification (e.g., to predict a classification of the file such as whether the file is malicious). For example, prediction module 235 uses the XGBoost machine learning classifier model to analyze the combined feature vector obtained based on a feature extraction of chunk data for a particular chunk to determine the classification of the streaming file. As another example, prediction module 235 uses a convolutional neural network model to analyze features/characteristics (e.g., a feature vector) based on a feature extraction of chunk data for the streaming file.

In some embodiments, prediction module 235 iteratively classifies the streaming file based on a next chunk to be analyzed. For example, prediction module 235 performs classification of the streaming file based on a single chunk (or single aligned chunk) of the streaming file. Prediction module 235 may successively analyze chunks in the streaming file and determine classifications for the file at each chunk so analyzed. For example, prediction module 235 determines predicted classifications for the file for each chunk in the streaming file, or until the prediction module 235 concludes that the predicted classification for a particular chunk exceeds the predetermined classification threshold (e.g., in which case prediction module 235 deems the streaming file to correspond to the predicted classification). At each chunk of the streaming file, system 200 may determine how to handle the streaming file (e.g., whether to permit transmission of the file, processing of the file, such as rendering of the file, etc.)

In some embodiments, system 200 comprises notification module 237. System 200 uses notification module 237 to provide an indication of the classification for the file (e.g., to provide an indication that the sample streaming file is malicious). For example, notification module 237 obtains an indication of a classification of the file (or a likelihood that the sample corresponds to a particular classification) from prediction module 235 and provides the indication of the classification to one or more security entities and/or one or more endpoints.

In some embodiments, system 200 comprises security enforcement module 239. System 200 uses security enforcement module 239 to enforce one or more security policies with respect to information such as network traffic, streaming files, etc. Security enforcement module 239 enforces the one or more security policies based on the classification of the file. As an example, system 200 stores policies respectively corresponding to different classifications, and such policies indicate a manner according to which the file is to be handled. Examples of policies that security enforcement module 239 may enforce include a policy for handling malicious files, a policy for handling files comprising financial information, a policy for handling files comprising GDPR data, a policy for handling files comprising export-controlled information, a policy for handling files comprising PII, etc.

As an example, in the case of system 200 being a security entity or firewall, system 200 comprises security enforcement module 239. Firewalls typically deny or permit network transmissions based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, information obtained via a web interface or other user interface such as an interface to a database system (e.g., an SQL interface), and/or other file transfers.

According to various embodiments, storage 215 comprises one or more of filesystem data 260, model data 262, and/or prediction data 264. Storage 215 comprises a shared storage (e.g., a network storage system) and/or database data, and/or user activity data.

In some embodiments, filesystem data 260 comprises a database such as one or more datasets (e.g., one or more datasets for files and/or file attributes, mappings of indicators of maliciousness or other classifications to files or hashes, signatures or other unique identifiers of files, mappings of indicators of benign files to files or hashes, signature or other unique identifiers of files, etc.). Filesystem data 260 comprises data such as historical information pertaining files (e.g., maliciousness of files), a whitelist of files deemed to be safe (e.g., not suspicious), a blacklist of files deemed to be suspicious or malicious (e.g., files for which a deemed likelihood of maliciousness exceeds a predetermined/preset likelihood threshold), information associated with suspicious or malicious files, etc. Filesystem data 260 comprises one or more policies, such as a security policy for handling malicious files, or other policies for handling other classifications.

Model data 262 comprises information pertaining to one or more models (e.g., classifiers) used to classify a file or predict a likelihood that a file matches a particular classification (e.g., a likelihood that the sample is malicious or suspicious). As an example, model data 262 comprises a convolutional neural network model that is configured to classify streaming files. As another example, model data 262 stores the classifier (e.g., a XGBoost machine learning classifier model(s) such as a detection model, a pre-filter model, or both) used in connection with a set of feature vectors or a combined feature vector. Model data 262 may comprise a feature vector that is generated with respect to each of the one or more of (i) a set of regex statements, and/or (ii) algorithmic-based features (e.g., a feature extracted using TF-IDF such as with respect to sample exploit traffic, etc.). In some embodiments, model data 262 comprises a combined feature vector that is generated based at least in part on the one or more feature vectors corresponding to each of the one or more of (i) a set of regex statements, and/or (ii) algorithmic-based features (e.g., a feature extracted using TF-IDF such as with respect to sample exploit traffic, etc.).

Prediction data 264 comprises information pertaining to a determination of whether the sample analyzed by system 200 corresponds to a particular classification (e.g., a prediction of whether the sample is malicious). For example, prediction data 264 stores an indication that the sample is malicious, an indication that the sample is benign, etc. The information pertaining to a determination can be obtained by notification module 237 and provided (e.g., communicated to the applicable security entity, endpoint, or other system). In some embodiments, prediction data 264 comprises hashes or signatures for samples such as samples that are analyzed by system 200 to determine whether such samples are malicious, or a historical dataset that has been previously assessed for maliciousness such as by a third party. Prediction data 264 can include a mapping of hash values to indications of maliciousness (e.g., an indication that the corresponding sample is malicious or benign, etc.).

According to various embodiments, memory 220 comprises executing application data 270. Executing application data 270 comprises data obtained or used in connection with executing an application such as an application executing a hashing function, an application to extract information from a file, or an application to analyze execution of a file within a sandbox. In embodiments, the application comprises one or more applications that perform one or more of receive and/or execute a query or task, generate a report and/or configure information that is responsive to an executed query or task, and/or to provide to a user information that is responsive to a query or task. Other applications comprise any other appropriate applications (e.g., an index maintenance application, a communications application, a machine learning model application, an application for detecting suspicious files, a document preparation application, a report preparation application, a user interface application, a data analysis application, an anomaly detection application, a user authentication application, a security policy management/update application, etc.).

Figure 3:
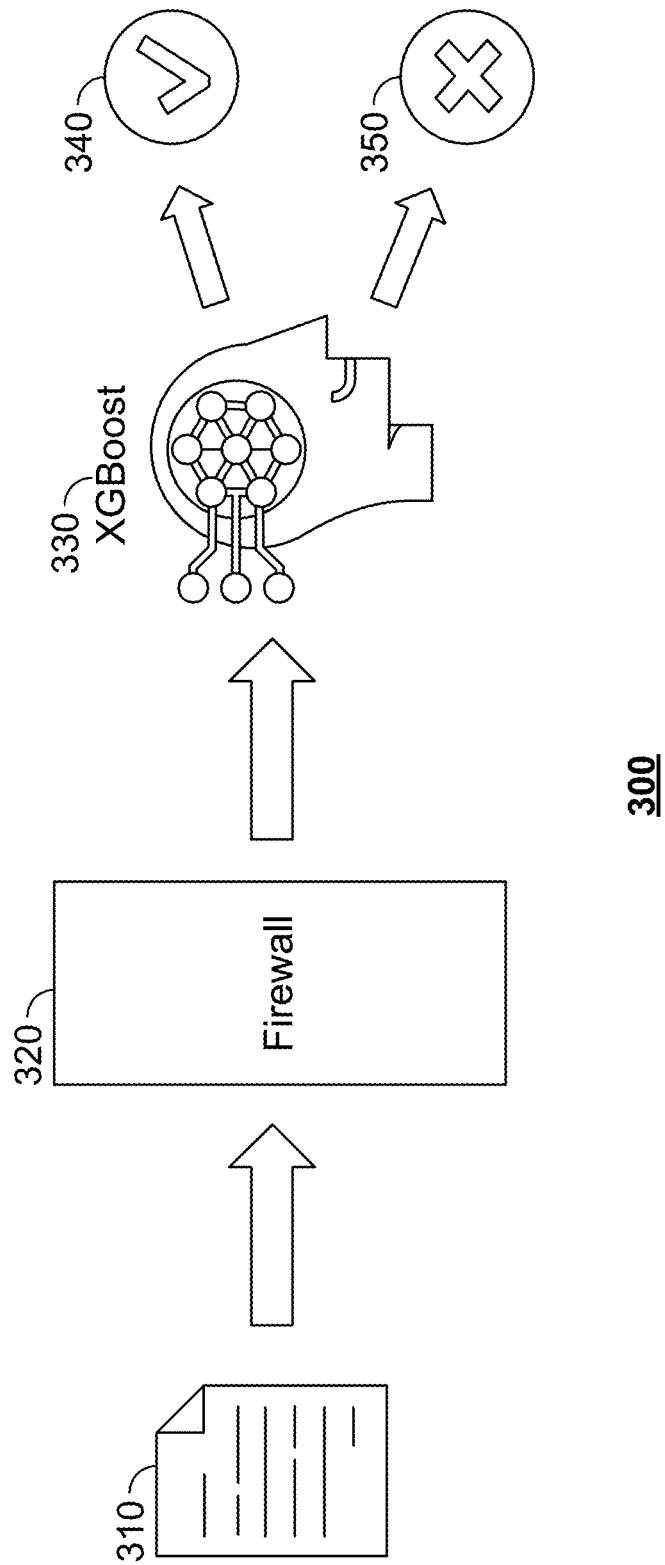
FIG. 3 is a bock diagram of a method for classifying a model.

FIG. 3 is a bock diagram of a method for classifying a model. In some embodiments, process 300 is implemented at least in part by system 100 of FIG. 1 and/or system 200 of FIG. 2. Process 300 may be implemented by an inline security entity.

At 310, a sample is communicated. The sample may be communicated across a network, or otherwise from one endpoint to another endpoint, etc.

At 320, the sample is obtained by a security entity such as a firewall. The firewall is configured to monitor traffic across a network or between two endpoints. In some embodiments, the firewall may be an application running on a client system and monitoring traffic to/from the client system.

At 330, the sample is analyzed using a machine learning model, such as an XGBoost model. Related art systems traditionally analyze a sample after the sample has been entirely received/processed. The related art systems obtain the entire sample, perform feature extraction with respect to the sample (or a portion thereof, such as the header information), and analyze the sample using the machine learning model. In some embodiments, the system (e.g., the firewall) performs feature extraction with respect to the file, generates a feature vector(s), queries the model based at least in part on the feature vector, and obtains a result from the model. As an example, the result may be an indication of whether the file is malicious or non-malicious. As another example, the result may be an indication of a likelihood of whether the file is malicious or non-malicious, and the system compares the predicted likelihood to a predefined maliciousness threshold to determine whether to deem the file as malicious.

In response to determining that the file is not malicious (e.g., is benign) at 330, process 300 proceeds to 340 at which the sample is treated as non-malicious traffic. For example, the firewall permits transmission or execution of the file.

Figure 4:
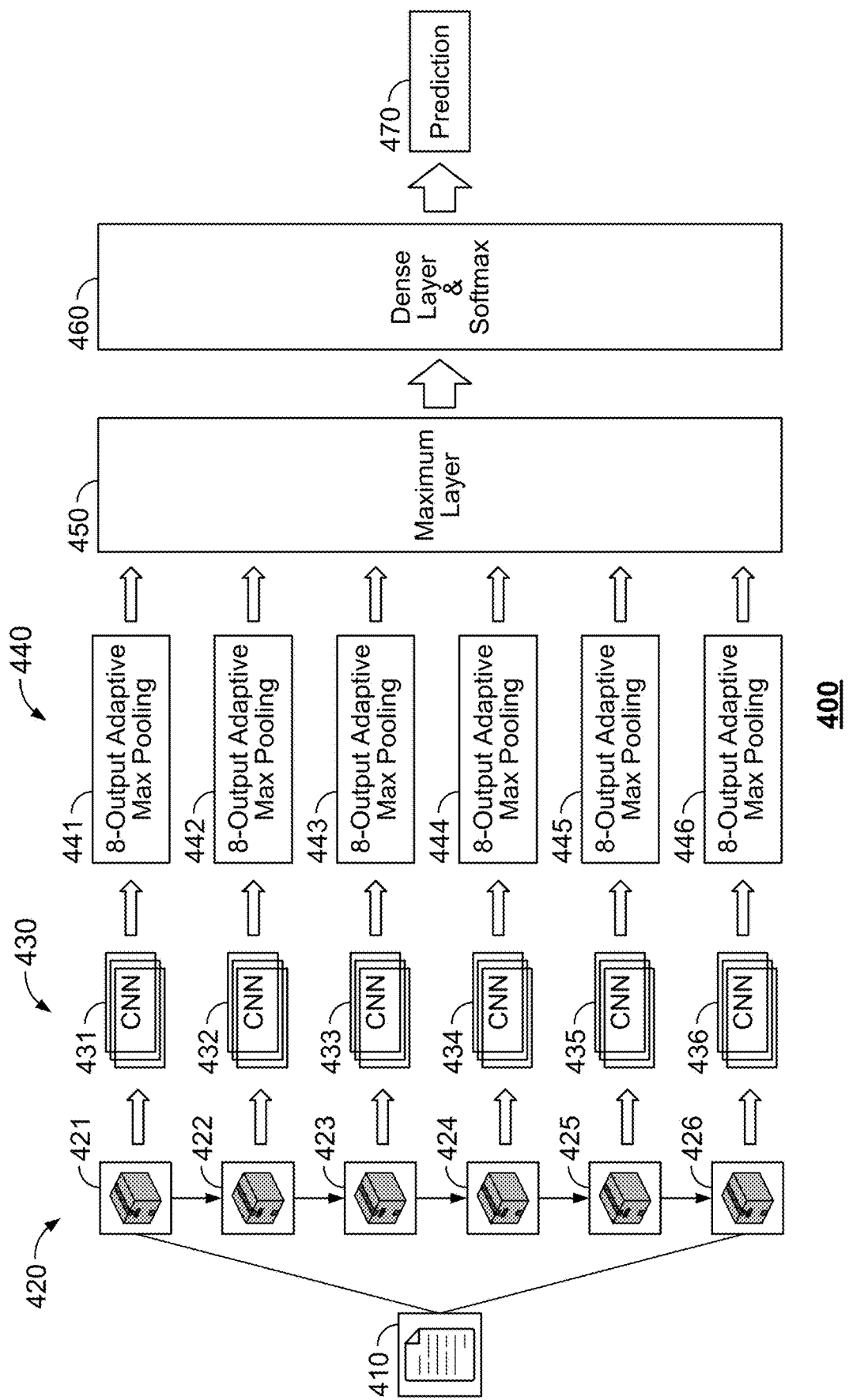
FIG. 4 illustrates a system for classifying a streaming file based on a subset of chunks of the streaming file according to various embodiments.

In response to determining that the file is malicious at 330, process 300 proceeds to 350 at which the sample is treated as malicious. For example, the firewall enforces one or more security policies with respect to the sample. As another example, the firewall blocks transmission of the FIG. 4 illustrates a system for classifying a streaming file based on a subset of chunks of the streaming file according to various embodiments. In some embodiments, system 400 is implemented at least in part by system 100 of FIG. 1 and/or system 200 of FIG. 2. System 400 may be implemented by an inline security entity.

In some embodiments, system 400 is configured to provide predictions of whether a file corresponds to a particular classification (e.g., whether the file is malicious) based on chunk data for a particular chunk of the file and before the entire file has been received/processed. As an example, system 400 is deployed in contexts where streaming files are received. Predicting classifications of the streaming file enable system 200 to provide low latency predictions/handling decisions. For example, system 200 is able to determine to handle the file according to a particular policy for a classification based on a determination that the prediction obtained by using of a chunk to predict the classification of the file satisfies a classification criterion/criteria (e.g., that the prediction, such as a predicted likelihood, exceeds the predefined classification threshold).

In some embodiments, system 400 is configured to provide the predictions of whether a file corresponds to a particular classification locally at an edge device, such as a firewall, a router, or other security entity. Because of memory and computing constraints of edge devices, system 400 is configured to generate predictions using a relatively small model and using a relatively small amount of data (e.g., very little data is retained for the classifications).

Referring to FIG. 4, at 410, the obtaining/processing of a sample is initiated, or at least a part of the sample is obtained/processed. For example, system 400 begins receiving a streaming file corresponding to the sample. Streaming files are typically relatively large, and thus, data for the streaming file is streamed over relatively long periods of time.

At 420, the system obtains one or more chunks of the streaming file. In some embodiments, system 400 successively receives/processes chunks of the streaming file, such as 421, chunk 422, chunk 423, chunk 424, chunk 425, etc. System 400 may use each particular chunk to determine a predicted classification of the streaming file, and on a chunk-by-chunk basis may determine how to handle the streaming file (e.g., determine a policy to enforce with respect to handling a file of a particular classification). The system obtains chunk data from a chunk to be analyzed (e.g., each chunk of the streaming file, or each chunk until a particular classification is made). System 400 then provides the chunk data for a particular chunk to convolutional neural network or other classifier to perform feature extraction and classification of the streaming file based on the chunk data.

At 430, chunk data is input to a convolutional layer. In the example shown, chunk data for chunk 421 is input to convolutional layer 431, chunk 422 is input to convolutional layer 432, chunk 423 is input to convolutional layer 433, chunk 424 is input to convolutional layer 434, chunk 425 is input to convolutional layer 435, chunk 426 is input to convolutional layer 436. The chunk data may be resized to an optimal size and the chunk data is input to the corresponding convolutional layer.

The convolutional layer comprises a filter or kernel, which is used to filter the chunk data. For example, the kernel lays over the chunk data. The extent to which the kernel lays over, or is used to process, certain chunk data is based on a kernel size (e.g., dimensions of the kernel). In some embodiments, performance (e.g., accuracy, speed, etc.) of the classification of the streaming file may be adjusted based on the kernel size used by the convolutional layer. Relatively larger kernel sizes generally have greater accuracy, but require relative larger machine learning models and the time to generate an inference/prediction is generally longer. Accordingly, it may be preferable to select a kernel size that corresponds to a model size suitable for the particular edge device and quick enough to generate low latency inferences, such as in accordance with a quality of service policy or other configurations. In some embodiments, the kernel size is between 8 and 12. In some embodiments, the kernel size is 8. The inference generated by the model is relatively quicker if the kernel size is 8 as compared to a larger kernel, such as a kernel size of 12, and the increase in performance between an implementation when the kernel size is 12 compared to when the kernel size is 8 is relatively insignificant. As such, selection of a kernel size of 8 may be preferable/optimal in balancing the inference speed and accuracy trade-offs.

In some embodiments, the kernel size used in the convolutional layer impacts the number of characters that are used as a lookback (e.g., a number of characters that are cached). The convolutional layers compare the chunk data piece by piece. For examples, convolutional layers use different features for different parts of the chunk data. The convolutional layer uses filters in connection with computing a match between the chunk data and a feature (e.g., a feature corresponding to a classification for which the classifier is used to generate a prediction).

Various embodiments implement a pooling mechanism in connection with analyzing chunk data (e.g., generating a prediction with respect to a particular classification). Pooling is a mechanism to take large amounts of information and shrink the information down while generally preserving important information in the output. In the example shown, the output from the convolutional layers 431-436 are respectively input to a corresponding one of maximum pooling modules 441-446. For example, at 440, the output from the convolutional layer 431 is input to maximum pooling module 441. The maximum pooling modules are configured to perform a max pooling operation with respect to the information output by the applicable convolutional layer. The max pooling operation is a pooling operation that calculates the maximum value (or largest value) of each feature map. As an example, the max pooling operations is a down sampling that results in a down sampled feature map that highlights the most present feature in the data.

At 450, the output from the maximum pooling operations (e.g., outputs from maximum pooling modules 441-446) are used to generate a maximum layer.

At 460, the maximum layer is processed by a dense layer. The dense layer may include applying an activation function, such as a softmax operation, to input data. The dense may convert the feature map output from the maximum layer to a probability distribution.

At 470, the output from the dense layer is used to generate a prediction (e.g., an inference). For example, the probability distribution output by the softmax operation is used to determine a prediction of a likelihood that the streaming file corresponds to a particular classification. The system may compare the prediction of the likelihood to a predefined classification threshold, and determine the classification based on results of the comparison. For example, the system deems the streaming file to correspond to a particular classification if the prediction exceeds the corresponding predefined classification threshold.

Figure 5:
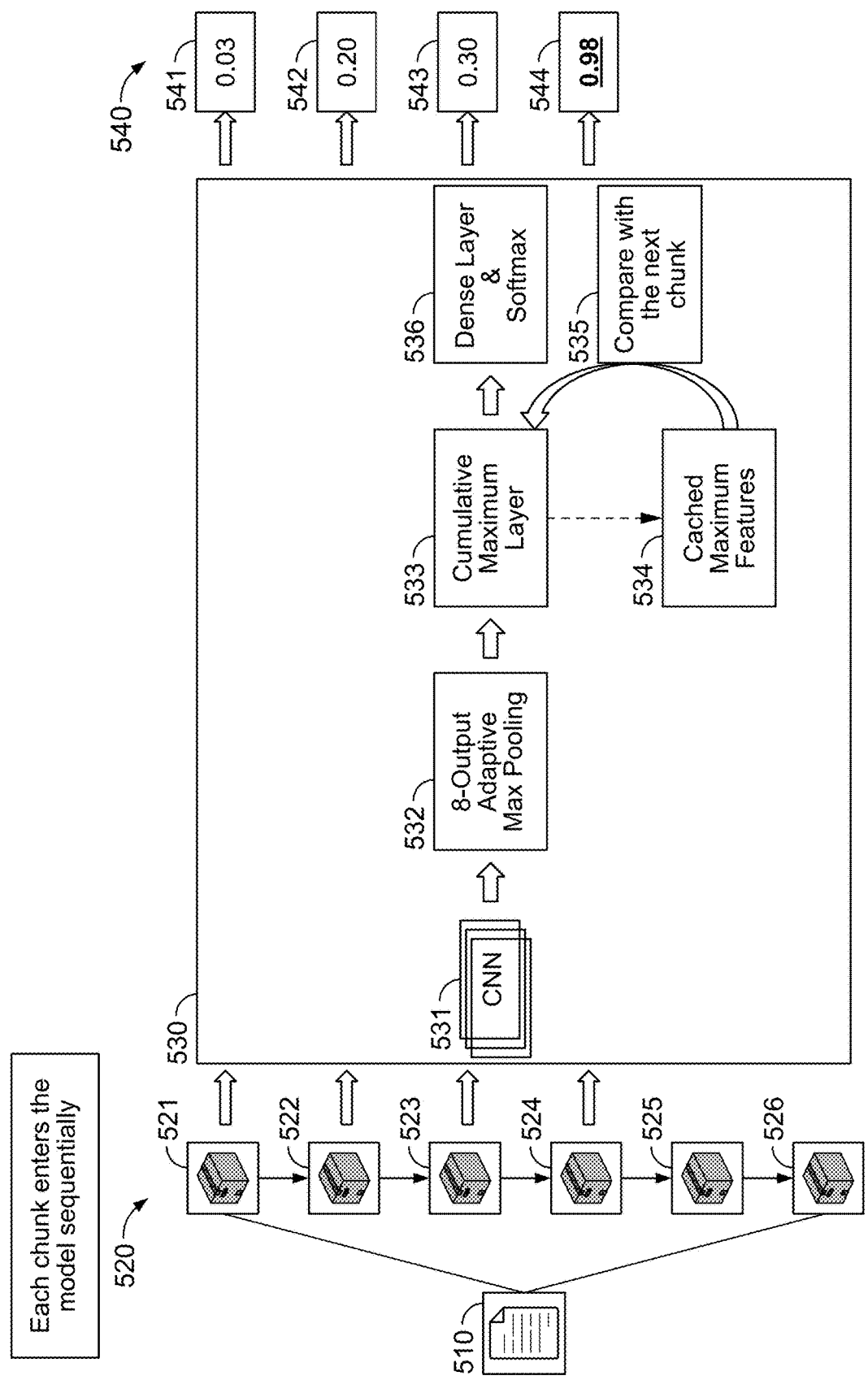
FIG. 5 illustrates a system for classifying a streaming file based on a subset of chunks of the streaming file according to various embodiments.

FIG. 5 illustrates a system for classifying a streaming file based on a subset of chunks of the streaming file according to various embodiments. In some embodiments, system 500 is implemented at least in part by system 100 of FIG. 1 and/or system 200 of FIG. 2. System 500 may be implemented by an inline security entity.

At 510, the obtaining/processing of a sample is initiated, or at least a part of the sample is obtained/processed. For example, system 500 begins receiving a streaming file corresponding to the sample.

At 520, the system obtains one or more chunks of the streaming file. In some embodiments, system 500 successively receives/processes chunks of the streaming file, such as 521, chunk 522, chunk 523, chunk 524, chunk 525, etc. System 500 may use each particular chunk to determine a predicted classification of the streaming file, and on a chunk-by-chunk basis may determine how to handle the streaming file (e.g., determine a policy to enforce with respect to handling a file of a particular classification). The system obtains chunk data from a chunk to be analyzed (e.g., each chunk of the streaming file, or each chunk until a particular classification is made). System 500 then provides the chunk data for a particular chunk to convolutional neural network or other classifier to perform feature extraction and classification of the streaming file based on the chunk data.

At 530, the chunk data for the received chunks of the streaming file are provided to a classifier for feature extraction and inference/prediction of a classification for the streaming file. The inference/prediction of the classification for the streaming may comprise, or correspond to, a prediction of whether the streaming file corresponds to a particular classification. In some embodiments, system 500 sequentially provides the plurality of chunks for the streaming file to the classifier for sequential feature extraction and inference.

The performing the feature extraction and generation of a prediction of the classification includes processing the corresponding chunk data using a convolutional layer (e.g., a convolutional neural network) at 531. The system obtains a feature map for the chunk based on the processing of the chunk data using the convolutional layer. In some embodiments, the convolutional layer uses a kernel having a kernel size of between 8 and 12. In some embodiments, the kernel size is 8.

In response to processing the chunk data using the convolutional layer, system 500 provides the output from the convolutional layer to a pooling mechanism. At 532, the output from the convolutional layer (e.g., for the particular chunk processed by the convolutional layer) is input to the pooling mechanism and the pooling mechanism performs max pooling operation.

At 533, system 500 provides the output from the pooling mechanism to generate a generate a maximum layer for the features associated with the chunk. The maximum layer is cached at 534 in cached maximum features, which can be used at 535 in connection with a comparison of features for the next chunk.

At 536, the maximum layer is processed by a dense layer. The dense layer may include applying an activation function, such as a softmax operation, to the input data. The dense may convert the feature map output from the maximum layer to a probability distribution.

At 540, the output from the dense layer is used to generate a prediction (e.g., an inference). For example, the probability distribution output by the softmax operation is used to determine a prediction of a likelihood that the streaming file corresponds to a particular classification. System 500 may compare the prediction of the likelihood to a predefined classification threshold, and determine the classification based on results of the comparison. For example, the system deems the streaming file to correspond to a particular classification if the prediction exceeds the corresponding predefined classification threshold.

In the example shown, system 500 successively generates predictions for successive chunks at 541, 542, 543, and 544. Predictions 541-544 may correspond to a likelihood that the streaming files corresponds to a particular classification. For example, in the case of a model for predicting whether the streaming file is malicious, the prediction output at 540 may correspond to a likelihood that the streaming file is malicious (e.g., based on the analysis of the corresponding chunk). In response to obtaining the predictions, system 500 may compare the predictions to a predetermined classification threshold. In the event that the predetermined classification threshold is 0.95 (or 95%), system 500 determines that the streaming file does not correspond to the particular classification (e.g., is not malicious) because predictions 541-543 are less than the predetermined classification threshold. Conversely, system 500 determines that prediction 544 is indicative of the streaming file corresponding to the particular classification because prediction 544 is greater than the predetermined classification threshold.

Figure 6:
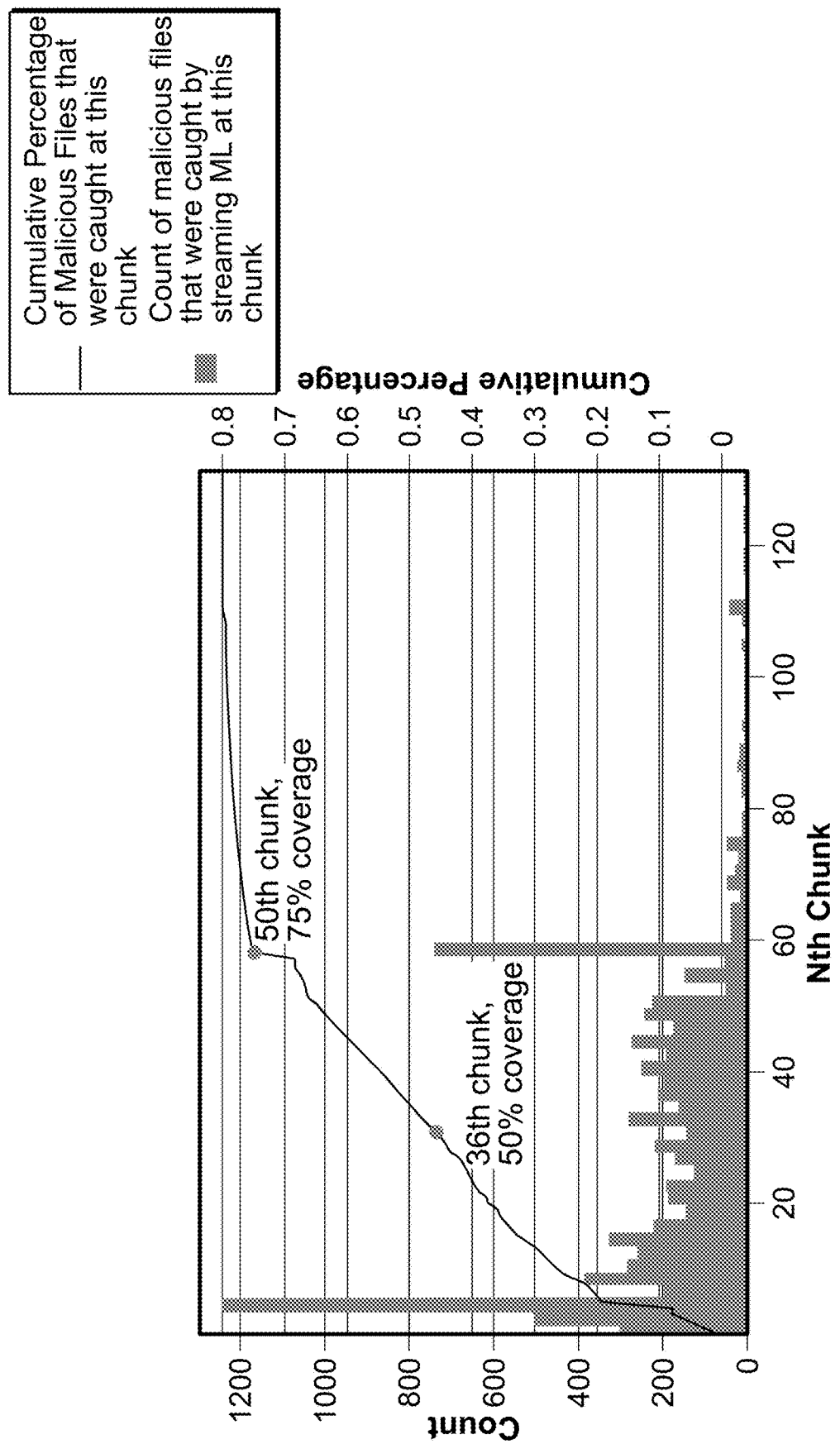
FIG. 6 illustrates a for a graph of performance of file classification using a subset of chunks of a streaming file according to various embodiments.

FIG. 6 illustrates a for a graph of performance of file classification using a subset of chunks of a streaming file according to various embodiments. In the example shown in FIG. 6, results 600 illustrates that malicious files were mostly identified based on a classification using an earlier chunk. Implementing various embodiments to classify a streaming file based on classification of particular chunks enables the system to classify a streaming file relatively early in the processing of the streaming file. Accordingly, the system according to various embodiments is able to identify that a streaming file corresponds to the applicable classification (e.g., malicious) early in the processing of the streaming file, thereby enabling the system to determine how to handle the streaming file early (e.g., before the complete streaming file has been received/processed), such as by enforcing an applicable policy for files deemed to correspond to the applicable classification. For example, 50% of the malicious files were identified by the 36th chunk of the streaming file, and 75% of the malicious files were identified by the 50th chunk of the streaming file.

Figure 7:
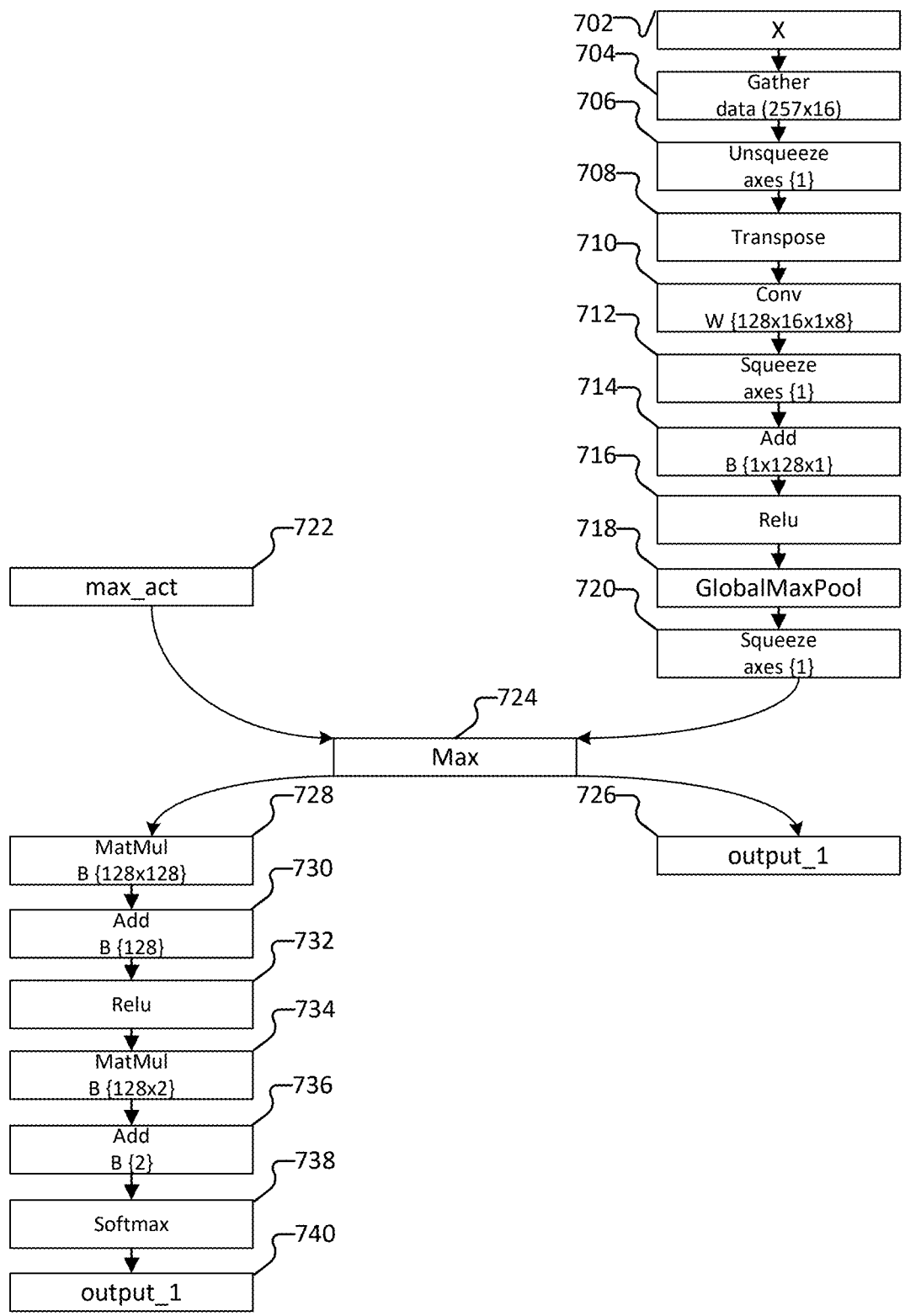
FIG. 7 is a flow diagram of a method for classifying a streaming file before processing the entirety of the streaming file according to various embodiments.

FIG. 7 is a flow diagram of a method for classifying a streaming file before processing the entirety of the streaming file according to various embodiments. In some embodiments, process 700 is implemented at least in part by system 100 of FIG. 1 and/or system 200 of FIG. 2. Process 700 may be implemented by an inline security entity.

At 702, a sequence of integers corresponds to the bytes of the chunk being analyzed are obtained. At 704, a gather operation is performed to provide a lookup to the unsigned integer between 0 and 256 and extracts its corresponding value of dimension 16. At 706, an unsqueeze operation is performed to expand the dimension by 1. At 708, the system transposes the dimension of the information to adapt the information to the applicable CNN format (e.g., a 1D CNN format). For example, the transpose operation may include determining a product of the batch, the channel, and the length. At 710 the system performs a convolution operation. For example, the system performs a 1D convolution along the length of the bytes with a predefined kernel size. In some embodiments, the kernel size is between 8 and 12. In some embodiments, the kernel size is 8. At 712, a squeeze operation is performed to remove a dimension with single values. At 714, an add operation is performed to add a bias of the output of the convolution. At 716, a rectified linear activation function (ReLU) is applied to perform a non-linear activation operation. At 718, a global max pool operation is performed. For example, the system obtains a single max value across all bytes (e.g., the length of the sequence). At 720, the system performs a squeeze operation to reduce the dimension of the max activation value. At 722, an external input tracks the max activation. For example, the system caches max activation values. At 724, the system performs a max pooling operation to obtain a max output of the global max pooling output and the max activation. At 726, the system stores the output from the max pooling operation in the cache. At 728, the system performs a matrix multiplication operation with weights of a linear layer. At 730, the system adds a bias to the output of the matrix multiplication operation. At 732, the system performs a non-linear activation operation (e.g., applies a non-linear activation function). At 734, the system performs a matrix multiplication with the weights of a linear layer. At 736, the system adds a bias to the output of the matrix multiplication operation. At 738, the system performs a softmax operation to obtain class probabilities (e.g., to obtain the probability distribution). At 740, the class probabilities are passed as an output.

Figure 8:
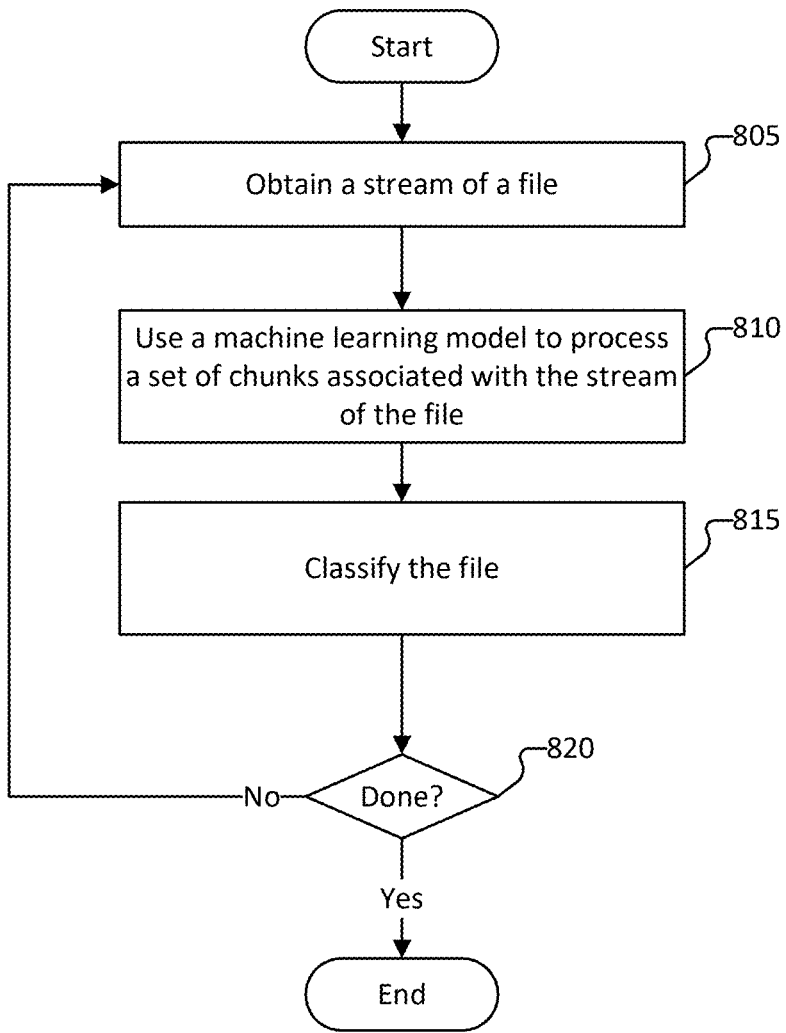
FIG. 8 is a flow diagram of a method for classifying a streaming file before processing the entirety of the streaming file according to various embodiments.

FIG. 8 is a flow diagram of a method for classifying a streaming file before processing the entirety of the streaming file according to various embodiments. In some embodiments, process 800 is implemented at least in part by system 100 of FIG. 1 and/or system 200 of FIG. 2. Process 800 may be implemented by an inline security entity.

At 805, a stream of a file is obtained. The obtaining the stream of a file (e.g., a streaming file) includes successively receiving chunks for the streaming file. For example, the streaming file is obtained by an edge device.

At 810, a machine learning model is used to process a set of chunks associated with the stream of the file. The system performs feature extraction with respect to a chunk, and queries the model using the feature (e.g., the feature vector/map). The system obtains a prediction in response to querying the model. The prediction may correspond to a probability/likelihood that the streaming file corresponds to the particular classification.

At 815, the file is classified. In some embodiments, the system classifies the file based on the prediction obtained from the model. For example, the system compares the prediction generated based on analyzing the chunk to a predefined classification threshold. In the event that the prediction exceeds the predefined classification threshold, the system deems the streaming file to correspond to the particular classification. For example, in the case of a model used to detect malicious files, if the predicted likelihood that the streaming file exceeds the predefined maliciousness threshold, the system deems the streaming file to be malicious.

At 820, a determination is made as to whether process 800 is complete. In some embodiments, process 800 is determined to be complete in response to a determination that no further samples are to be analyzed (e.g., no further predictions for samples are needed), no further traffic is to be analyzed, an administrator indicates that process 800 is to be paused or stopped, etc. In response to a determination that process 800 is complete, process 800 ends. In response to a determination that process 800 is not complete, process 800 returns to 805.

In some embodiments, the system may implement process 800 for each successive chunk of the streaming file until all chunks have been processed or the system deems the streaming file to correspond to a particular classification (e.g., the classification for which the model is deployed).

Figure 9:
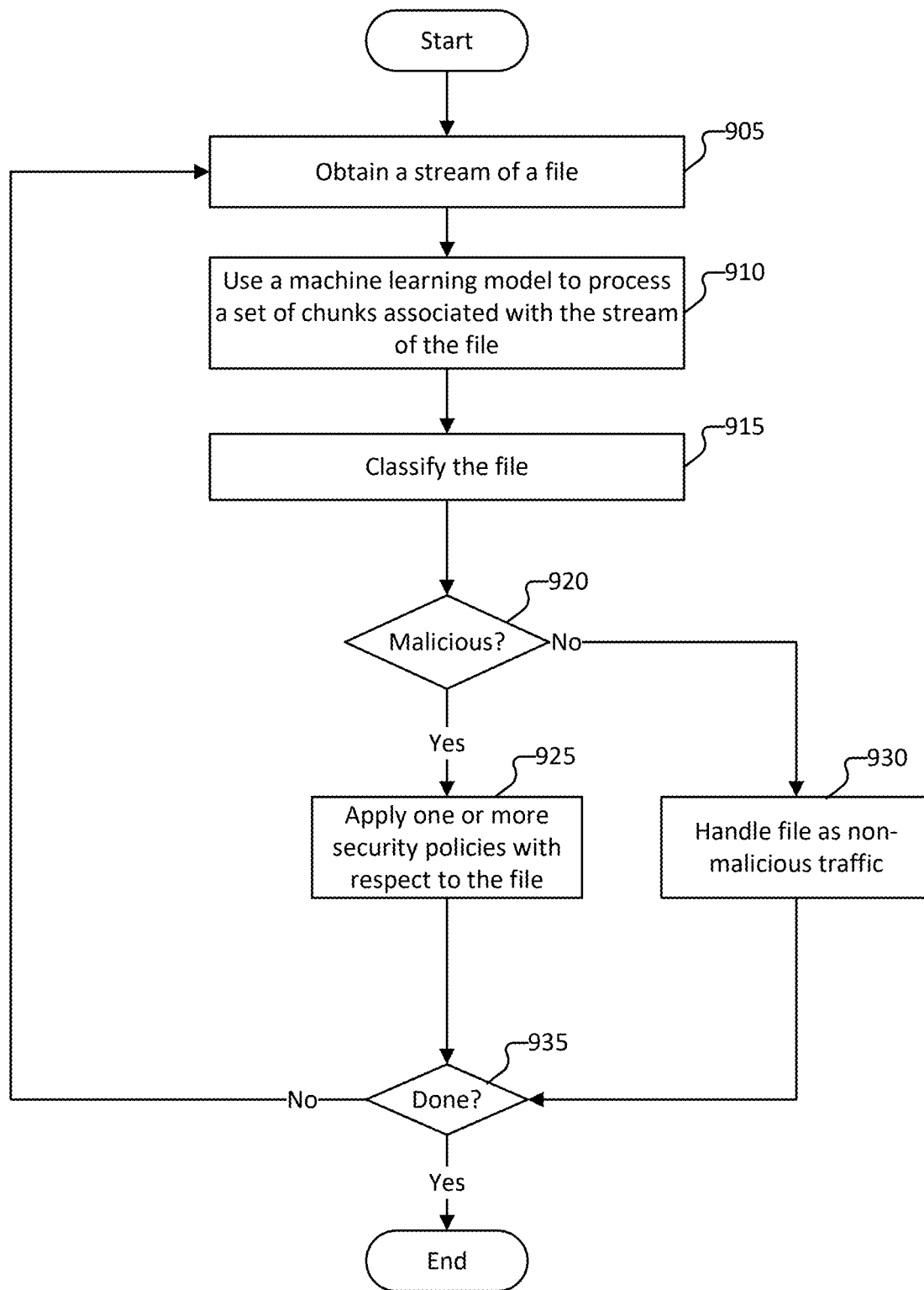
FIG. 9 is a flow diagram of a method for classifying a streaming file before processing the entirety of the streaming file according to various embodiments.

FIG. 9 is a flow diagram of a method for classifying a streaming file before processing the entirety of the streaming file according to various embodiments. In some embodiments, process 900 is implemented at least in part by system 100 of FIG. 1 and/or system 200 of FIG. 2. Process 900 may be implemented by an edge device such as an inline security entity.

Process 900 is implemented to determine whether a streaming file is malicious. For example, process 900 analyzes each successive chunk (at least until the file is deemed malicious) and classifies the file based on the analysis of the chunk(s).

At 905, a stream of a file is obtained. In some embodiments 905 corresponds to, or is similar to 805 of process 800.

At 910, a machine learning model is used to process a set of chunks associated with the stream of the file. In some embodiments 910 corresponds to, or is similar to 810 of process 800.

At 915, the file is classified. In some embodiments 915 corresponds to, or is similar to 815 of process 800.

At 920, the system determines whether the file is malicious. The system determines whether the output of comparing the prediction obtained from the model exceeds the predefined classification file is indicative of the file being malicious.

In response to determining that the file is malicious at 920, process 900 proceeds to 925 at which one or more security policies are applied with respect to the file. Conversely, in response to determining that the file is not malicious at 920, process 900 proceeds to 930 at which the file is handled as non-malicious traffic.

At 935, a determination is made as to whether process 900 is complete. In some embodiments, process 900 is determined to be complete in response to a determination that no further samples are to be analyzed (e.g., no further predictions for samples are needed), no further traffic is to be analyzed, an administrator indicates that process 900 is to be paused or stopped, etc. In response to a determination that process 900 is complete, process 900 ends. In response to a determination that process 900 is not complete, process 900 returns to 905.

Figure 10:
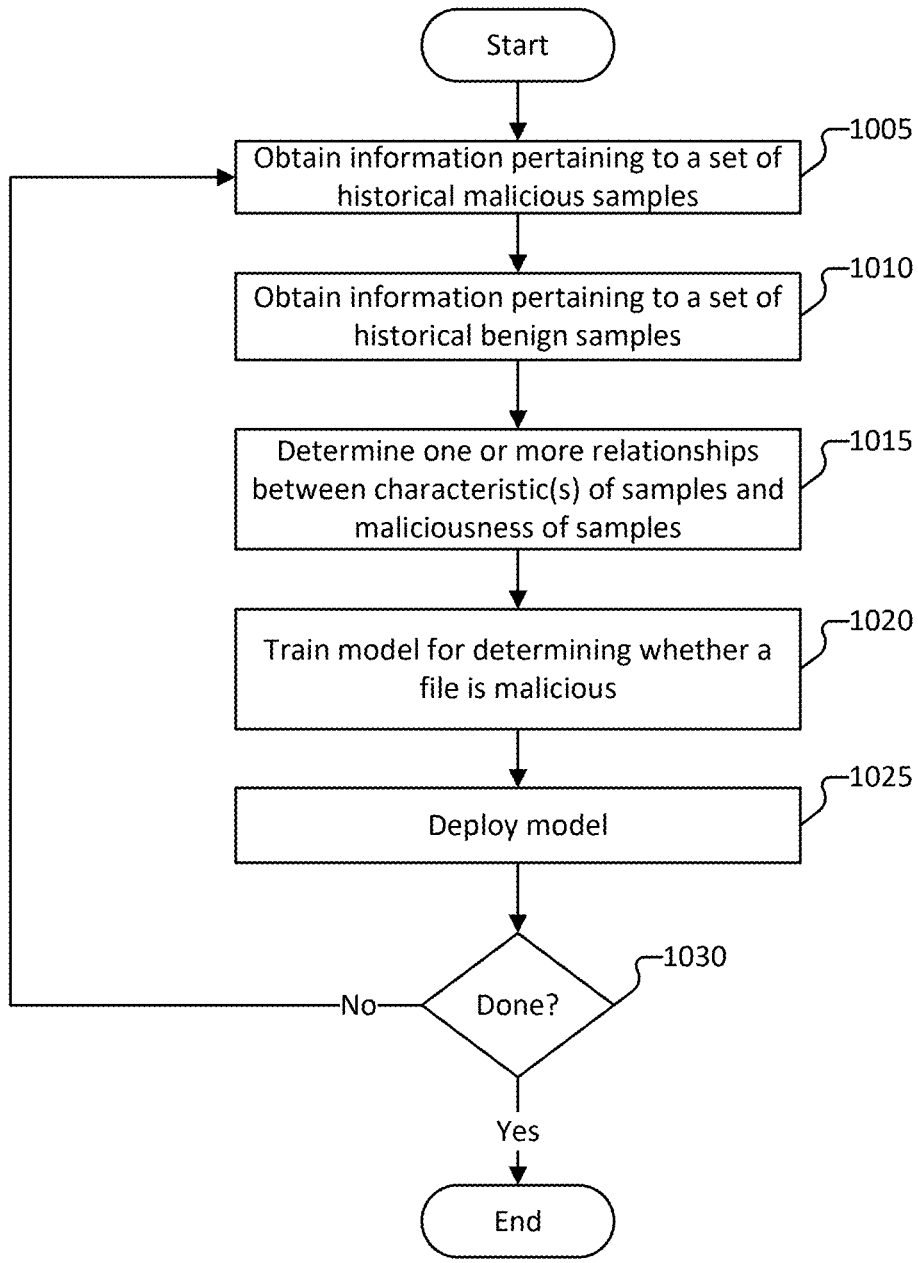
FIG. 10 is a flow diagram of a method for training a classification model according to various embodiments.

FIG. 10 is a flow diagram of a method for training a classification model according to various embodiments. In some embodiments, process 1000 is implemented at least in part by system 100 of FIG. 1 and/or system 200 of FIG. 2. Process 1000 may be implemented by an inline security entity.

Process 1000 is implemented to train a model to detect malicious files. In some embodiments, process 1000 is implemented by a server, which provides the trained model to an edge device for inline sample classification.

At 1005, information pertaining to a set of historical malicious samples is obtained. As an example, the system obtains the information pertaining to a set of historical malicious samples from a third-party service (e.g., VirusTotal™). As another example, the system obtains the information pertaining to a set of historical malicious samples based on manual tagging by human operators.

At 1010, information pertaining to a set of historical benign samples is obtained. As an example, the system obtains the information pertaining to a set of historical benign samples from a third-party service (e.g., VirusTotal™). As another example, the system obtains the information pertaining to a set of historical benign samples based on manual tagging by human operators.

At 1015, one or more relationships between characteristic(s) of samples and maliciousness of samples is determined. In some embodiments, the system determines features pertaining to whether a streaming file is malicious or a likelihood that a streaming file is malicious. The features can be determined based on a malicious feature extraction process performed with respect to the samples.

In some embodiments, the features can be determined with respect to a set of regex statements (e.g., predefined regex statements) and/or with respect to use of an algorithmic-based feature extraction (e.g., TF-IDF, etc.).

In some embodiments, the system divides the respective samples into chunks. As an example, the chunks correspond to a predefined number of bytes. In response to obtaining the chunks from the historical samples, the system performs feature extraction with respect to the information comprised in the chunks for the samples.

At 1020, a model is trained for determining whether a file is malicious. The model is a machine learning model that is trained using a machine learning process. In some embodiments, the model is trained using a convolutional neural network. Various other machine learning processes may be implemented. Examples of other machine learning processes that can be implemented in connection with training the model include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc.

At 1025, the model is deployed. In some embodiments, the deploying the model includes storing the model in a dataset of models for use in connection with analyzing samples to classify the samples (e.g., determine whether the samples are malicious in the case of the model being a detection model that detects malicious samples). In some embodiments, the deploying the model includes storing the model in a dataset of models for use in connection with analyzing samples to determine whether the samples are malicious or suspicious (e.g., in the case of the model being a pre-filter model that pre-filters network traffic based on detection of malicious or suspicious samples). The deploying the model can include providing the model (or a location at which the model can be invoked) to an edge device such as a security entity.

At 1030, a determination is made as to whether process 1000 is complete. In some embodiments, process 1000 is determined to be complete in response to a determination that no further samples are to be analyzed (e.g., no further predictions for samples are needed), no further traffic is to be analyzed, an administrator indicates that process 1000 is to be paused or stopped, etc. In response to a determination that process 1000 is complete, process 1000 ends. In response to a determination that process 1000 is not complete, process 1000 returns to 1005.

Figure 11:
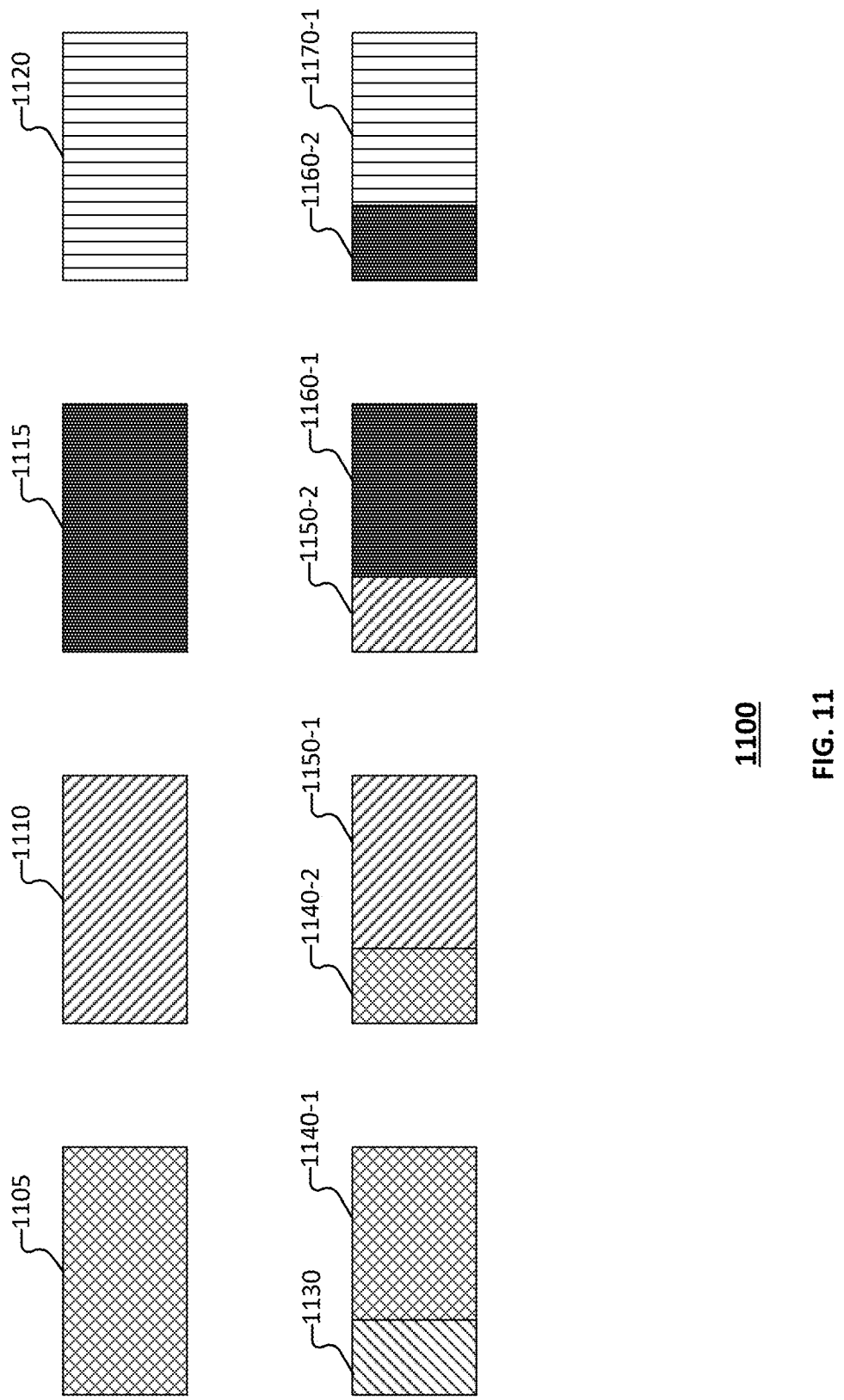
FIG. 11 is a diagram of a set of chunks associated with a streaming file according to various embodiments.

FIG. 11 is a diagram of a set of chunks associated with a streaming file according to various embodiments. In some embodiments, alignment and/or classification of the set of chunks is implemented at least in part by system 100 of FIG. 1 and/or system 200 of FIG. 2. The classification of the chunks may be implemented by an inline security entity.

In the example shown, a streaming file comprises a set of chunks, such as chunk 1105, chunk 1110, chunk 1115, and chunk 1120. Chunks 1105-1120 may not necessarily comprise the same type of information. For example, profiles of the files received may be non-linear. A file may include header information, and the header information may be comprised in the first chunk. However, in order for a model to be deterministic for classifying files, the analyzed chunks comprise a same type of information. Various embodiments address the problem arising for non-linear file profiles by aligning the chunk data in the chunk.

In some embodiments, aligning the chunk data includes deeming a first subset of chunk data of a particular chunk and a second subset of chunk data of a different chunk as chunk data for a single chunk. For example, the system obtains a first predefined number of bytes from a particular chunk and a second predefined number of bytes from a successive chunk, and deems such information collectively as chunk data for a single chunk. In response to aligning the chunk data, the system classifies the streaming file based on analyzing the various chunks in the streaming file (or until the system determines that the streaming file corresponds to a particular classification).

As illustrated in FIG. 11, chunk 1105 comprises header information 1130 and payload data 1140-1. Header information 1130 may be a predefined number of bytes based on a type of file. To align the chunk data (e.g., to deem chunks that comprise only payload data for analysis to generate a classification prediction), the system obtains payload data 1140-1 from a first chunk and payload data 1140-2 from a second chunk. The system deems chunk data for chunk 1105 to comprise payload data 1140-1 and payload data 1140-2. The obtaining payload data 1140-1 from the first chunk may include obtaining a predefined number of bytes from a back of the chunk. As an example, the system may obtain the last X bytes from a particular chunk and the first Y bytes from a successive chunk. In response to obtaining the chunk data for a particular chunk (e.g., chunk data for chunk 1105), the system queries a model based on the chunk data, and obtains a prediction of whether the streaming file corresponds to a particular classification (e.g., whether the streaming file is malicious, etc.).

Similarly, the system deems (i) payload 1150-1 of a second chunk and payload 1150-2 of a third chunk as chunk data for chunk 1110 (e.g., a single chunk for processing to generate a prediction), (ii) payload 1160-1 of the third chunk and payload 1160-2 comprised in the fourth chunk as chunk data for chunk 1115. Payload 1170-1 may be combined with a subset of data comprised in the subsequent chunk.

In response to aligning the chunks, the system uses the corresponding chunk data to make a prediction of whether the streaming file corresponds to a particular classification.

Figure 12:
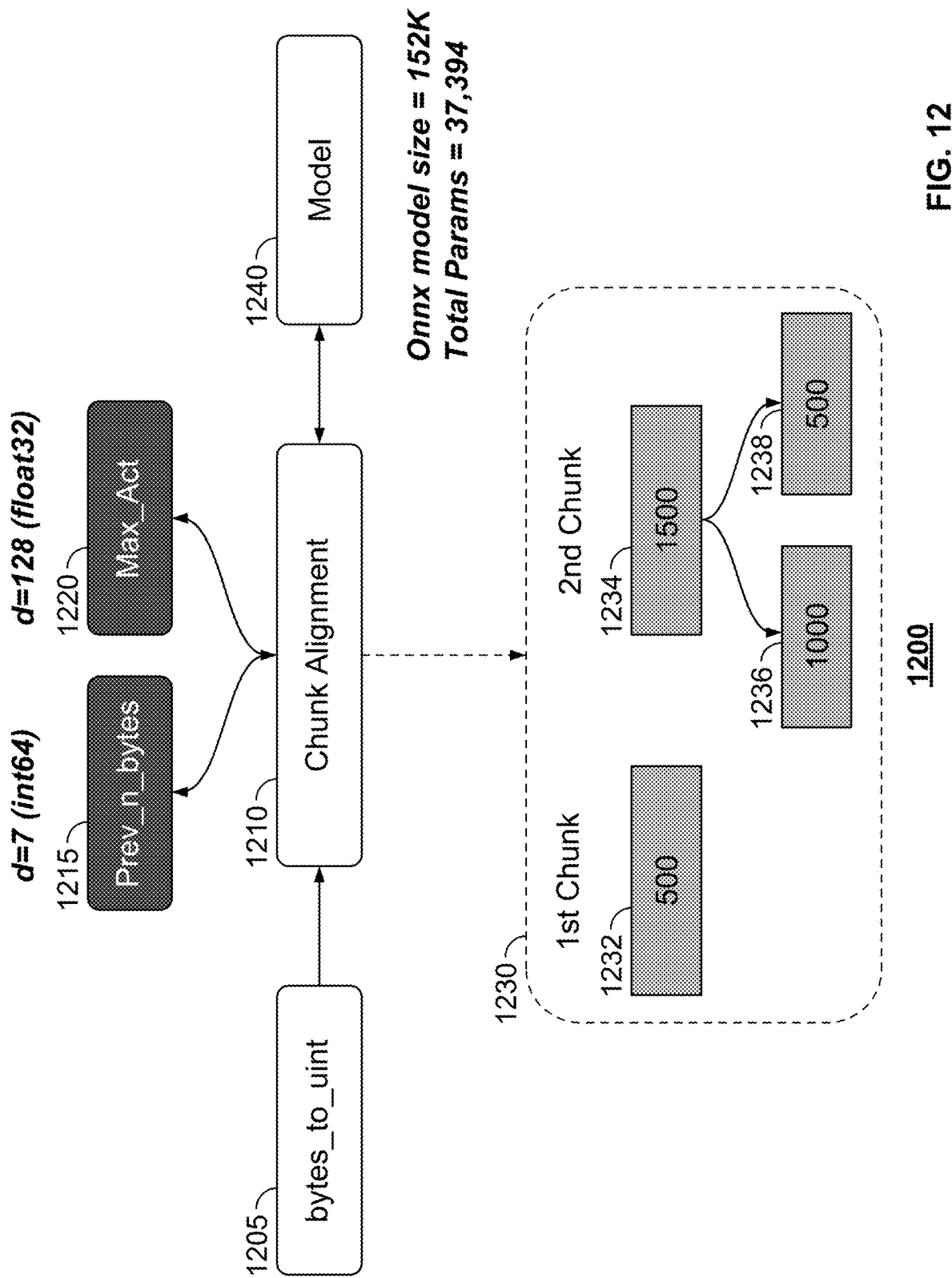
FIG. 12 is a flow diagram of a method for detecting a malicious file according to various embodiments.

FIG. 12 is a flow diagram of a method for detecting a malicious file according to various embodiments. In some embodiments, alignment and/or classification of the set of chunks is implemented at least in part by system 100 of FIG. 1 and/or system 200 of FIG. 2. The classification of the chunks may be implemented by an inline security entity.

At 1205, bytes are input to a chunk alignment mechanism. In some embodiments, the input bytes are bytes converted to unsigned integer values between 0 and 255.

At 1210, the system (e.g., a chunk alignment mechanism) obtains bytes from chunk data of the streaming file and processes a set of chunks to align the chunk data. For example, the system takes variable length chunk size and based on the offset from the first bytes splits the chunk data.

Referring to 1230, the chunk alignment includes obtaining a subset of bytes of a first chunk and a subset of bytes of a second chunk. The subset of bytes obtained from the first chunk and/or the second chunk may be predefined, such as in a chunk alignment policy or based on a type of file being processed. In the example shown, chunks comprise 1500 bytes. In the example shown, 1000 bytes of the first chunk may correspond to header information, which may be thrown away (or disregarded with respect to generating predictions of file classification). For example, the subset of bytes 1232 of a first chunk corresponds to payload data. In order to ensure a same number of payload data is analyzed to generate a prediction, the system obtains subsets of bytes from successive chunks. Accordingly, the system deems the subset of bytes 1232 of a first chunk and a subset of bytes 1236 of second chunk 1234 as chunk data for a single chunk to be analyzed for generating a prediction. As illustrated, because the subset of bytes obtained from the first chunk is 500 bytes and because a predefined chunk size is 1500 bytes, the subset of bytes 1236 comprises 1000 bytes. The second subset of bytes 1238 of second chunk 1234 are in turn used in conjunction with a subset of bytes from a successive chunk (e.g., a third chunk).

If the expected chunk size is 1500 bytes and the first chunk is also 1500 bytes (of payload data), then the offset is 0 and all the packets would be aligned and no alignment of chunk data is needed. Conversely, if the expected chunk size is 1500 bytes and the first chunk comprises an offset (e.g., header information that causes an offset), then the offset is used to split subsequent chunks to obtain information from the aligned chunks. The offset may be predefined based on file type, or may be determined by the system as the streaming file is received. In the example shown, the first chunk is 500 bytes (of payload data), and thus the offset is 1000 bytes, so second chunk 1234 is split into a first subset of bytes 1236 and a second subset of bytes 1238. First subset of bytes 1236 and a second subset of bytes 1238 may be used in different chunks for chunk alignment and generation of prediction.

Returning to 1210, the system (e.g., the chunk alignment mechanism, such as chunk alignment module 229 of system 200) obtains an extraction of bytes of size k−1 1215, where k is the largest kernel size used in the model (e.g., the convolutional neural network). The extraction of the set of k−1 byes may be a previous k−1 bytes such as from a previous chunk. The system (e.g., the chunk alignment mechanism) obtains max activation value 1220 for the various chunks. For example, the system keeps track of the max activation of aligned chunks (e.g., every 1500 bytes in the above example).

According to various embodiments, the system (e.g., the chunk alignment mechanism) implements a predefined algorithm to align chunk data. The algorithm includes:

```
initializing an aligned chunk size = m;
calculate chunk size = n;
obtain offset k = m-n;
if m = 0,
    pass the chunks to the model and obtain max activation and
    prediction for file classification; and
else,
    split the chunk into k and n-k sizes;
    pass the previous max activation along with k bytes to obtain
    the max activation and prediction for file classification; and
    pass the remaining n-k bytes to update the max activation.
```

Figure 13:
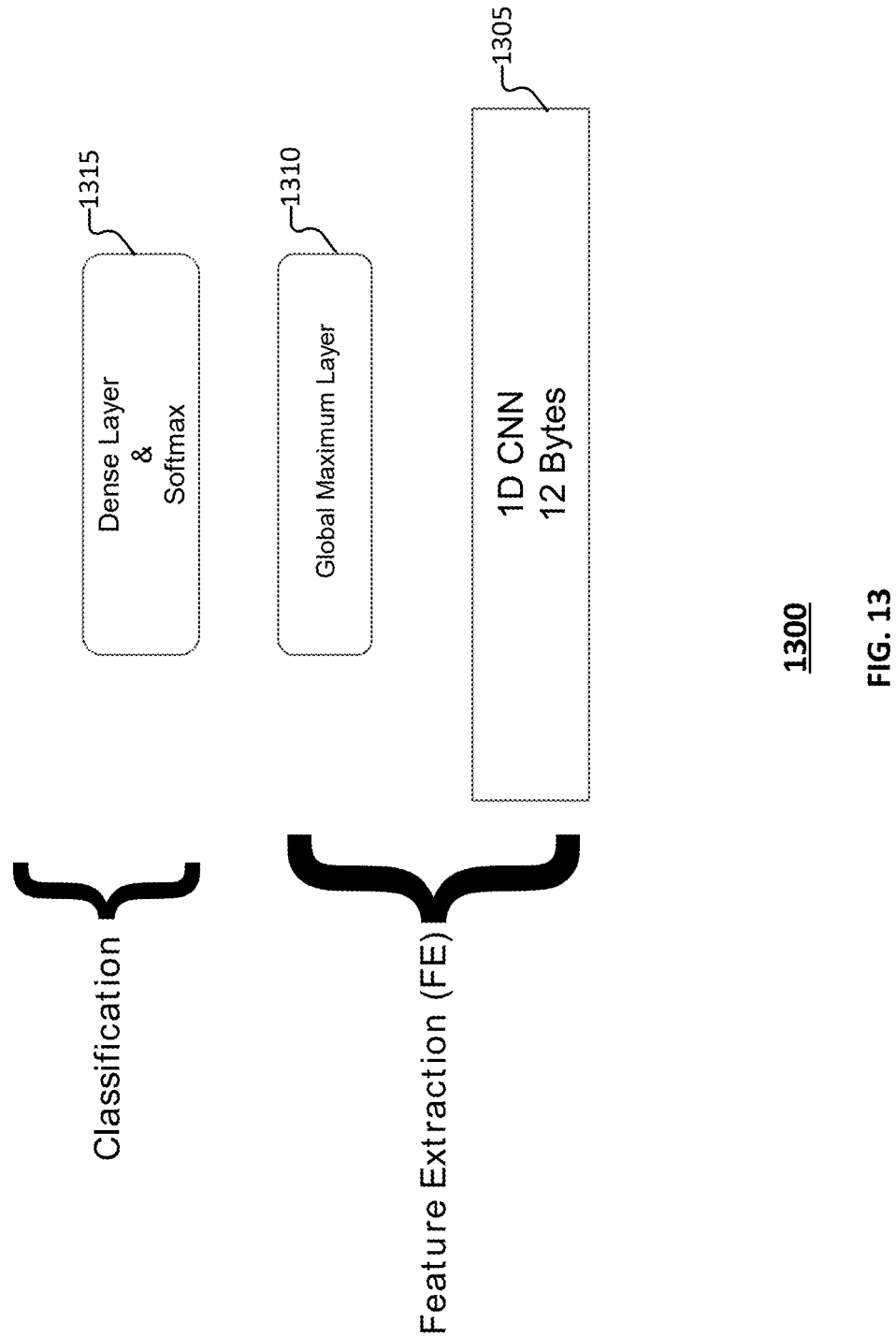
FIG. 13 is a block diagram of a system for classifying a streaming file based on chunk data according to various embodiments.

FIG. 13 is a block diagram of a system for classifying a streaming file based on chunk data according to various embodiments. In some embodiments, system 1300 may be implemented at least in part by system 100 of FIG. 1 and/or system 200 of FIG. 2. The classification of the chunks may be implemented by an inline security entity.

System 1300 classifies the file based on performing a feature extraction with respect to chunk data and classification. The feature extraction includes processing the chunk data using convolutional neural network 1305 and processing the output from convolutional neural network 1305 using global maximum layer 1310. In the example shown, convolutional neural network 1305 is a one-dimensional convolutional neural network with a kernel size of 12. However, various other kernel sizes may be implemented. In some embodiments, the kernel size is 8. In response to passing the chunk data through convolutional neural network 1305, the system provides the output from convolutional neural network 1305 to global maximum layer 1310 to obtain max activation (e.g., max activation value(s)). For example, global maximum layer 1310 performs a max pooling operation on the output from convolutional neural network 1305.

In response to performing feature extraction, the system performs classification with respect to the feature vector/map to obtain a prediction of whether the streaming file corresponds to a particular classification. The classification of the streaming file based on a particular chunk of data of the streaming file includes processing the output from global maximum layer 1310 using dense layer and softmax module 1315.

Figure 14:
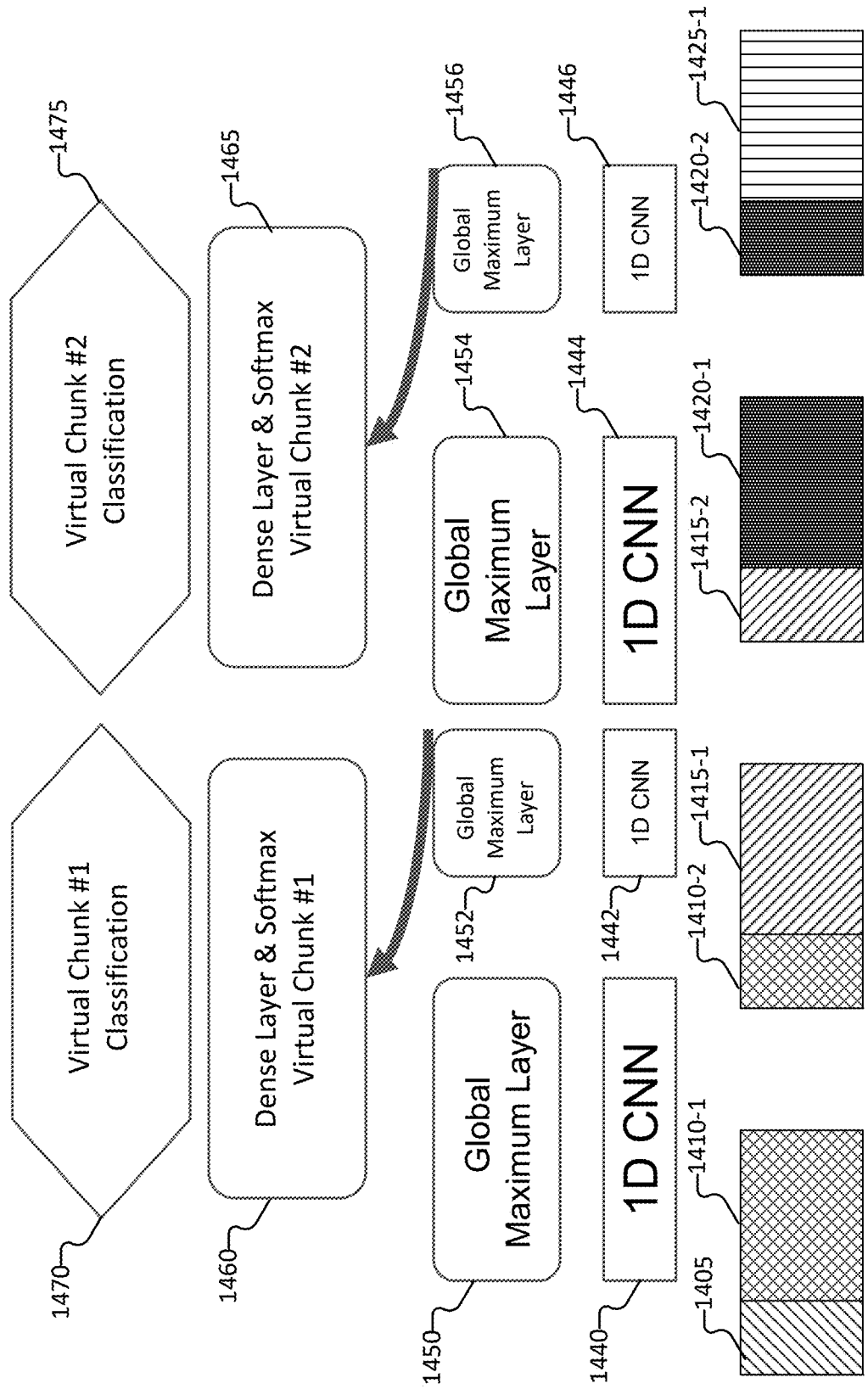
FIG. 14 is a block diagram of classification of a set of chunks obtained in a stream of a file according to various embodiments.

FIG. 14 is a block diagram of classification of a set of chunks obtained in a stream of a file according to various embodiments. In some embodiments, classification of the set of chunks is implemented at least in part by system 100 of FIG. 1 and/or system 200 of FIG. 2. The classification of the chunks may be implemented by an inline security entity.

System 1400 performs classification of a streaming file based on chunk data for a particular chunk. System 1400 obtains streaming file based on receiving successive chunks. A first chunk includes header information 1405 and payload information 1410-1; a second chunk includes payload information 1410-2 (e.g., a first subset of bytes of the second chunk) and payload information 15-1 (e.g., a second subset of bytes of the second chunk); a third chunk includes payload information 1415-2 (e.g., a first subset of bytes of the third chunk) and payload information 1420-1 (e.g., a second subset of bytes of the third chunk); and fourth chunk includes payload information 1420-2 (e.g., a first subset of bytes of the fourth chunk) and payload information 1425-1 (e.g., a second subset of bytes of the fourth chunk). Because the first chunk comprises header information 1405, the payload data of the chunks of the streaming file have an offset equal to the number of bytes of header information 1405.

System 1400 successively applies a convolutional neural network model on successive chunks. For example, at 1440, system 1400 passes payload information 1410-1 of the first chunk through the convolutional neural network; at 1442, system 1400 passes payload information 14010-2 and 1415-1 through the convolutional neural network; at 1444, system 1400 passes payload information 1415-2 and 1420-1 through the convolutional neural network; and at 1446, system 1400 passes payload information 1420-2 and 1425-1 through the convolutional neural network.

In response to passing the chunks (e.g., the payload information) through the convolutional neural network, system 1400 passes the output from the convolutional neural network through pooling layers. For example, at 1450, system 1400 passes the output from 1440 through a global maximum layer; at 1452, system 1400 passes the output from 1442 through the global maximum layer; at 1454, system 1400 passes the output from 1444 through the global maximum layer; and 1456, system 1400 passes the output from 1446 through the global maximum layer. As an example, the global maximum layer performs a max pooling operation on outputs from the convolutional layer.

At 1460, system 1400 passes the output from the global maximum layer (e.g., the max activation values) for payload information 1410-1 and payload information 1410-2 through a dense layer and softmax operation for a first virtual chunk (e.g., a chunk aligned with payload information from the first received chunk and the second received chunk). Similarly, at 1465, system 1400 passes the output from the global maximum layer (e.g., the max activation values) for payload 1415-1 and payload 1452-2 through a dense layer and softmax operation for a second virtual chunk.

At 1470, system 1400 uses the output from the dense layer and softmax operation for a first virtual chunk to determine a classification for the streaming file based on the first virtual chunk. For example, system 1400 generates a prediction of a likelihood that the streaming file corresponds to a particular classification. Similarly, at 1475, system 1400 uses the output from the dense layer and softmax operation for a second virtual chunk to determine a classification for the streaming file based on the second virtual chunk.

System 1400 successively classifies and generates predictions of whether the streaming file corresponds to a particular classification using successive chunk data (e.g., successive aligned chunks, or virtual chunks). System 1400 may perform the successive classification and generation of prediction until the earlier of (i) all chunks in the streaming file have been processed for classification, and (ii) system 1400 determines that the streaming file corresponds to the particular classification based on the prediction (e.g., system 1400 determining that the prediction exceeds a predefined classification threshold).

Figure 15:
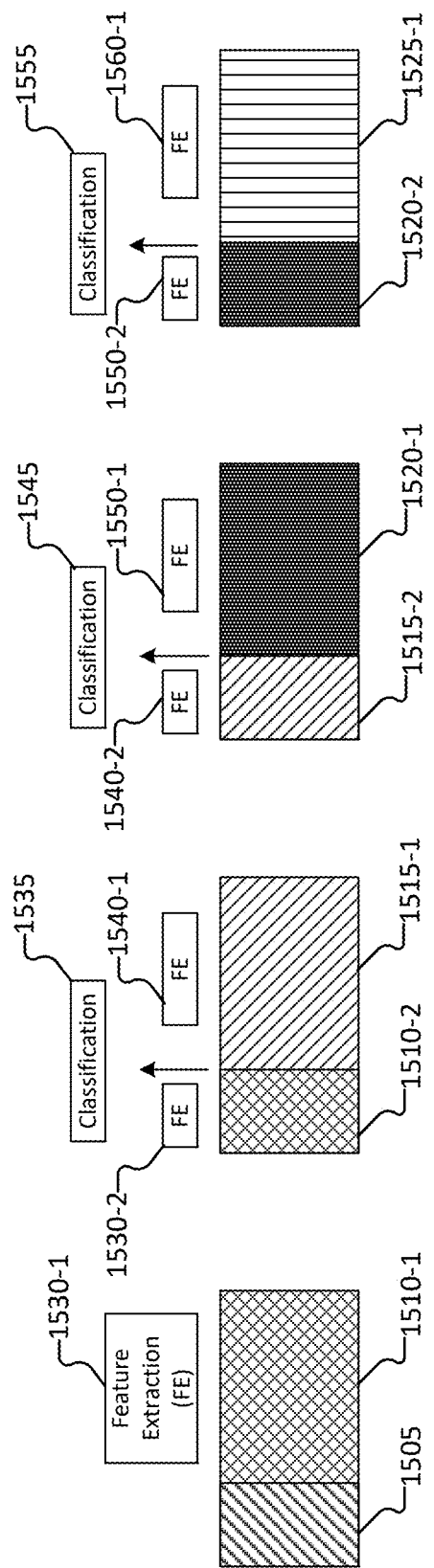
FIG. 15 is a block diagram of classification of a set of chunks obtained in a stream of a file according to various embodiments.

FIG. 15 is a block diagram of classification of a set of chunks obtained in a stream of a file according to various embodiments. In some embodiments, classification of the set of chunks is implemented at least in part by system 100 of FIG. 1 and/or system 200 of FIG. 2. The classification of the chunks may be implemented by an inline security entity.

System 1500 classifies a streaming file based on analysis of successive chunks. For example, as system 1500 receives chunks for a streaming file, system 1500 processes the corresponding chunk data and generates successive predictions of whether the streaming file is malicious.

In the example shown, the first chunk comprises header information 1505 (or other offset) and payload information 1510-1; the second chunk comprises payload information 1510-2 and 1515-1; the third chunk comprises payload information 1515-2 and 1520-1; and the fourth chunk comprises payload information 1520-2 and 1525-1.

System 1500 performs feature extraction 1530-1 with respect to payload information 1510-1 obtained from the first chunk; and performs feature extraction 1530-2 with respect to payload information 1510-2 obtained from the second chunk. In response to performing feature extraction 1530-1 and 1530-2, system 1500 performs a classification 1535 of the streaming file (e.g., a prediction based on analysis of a first virtual chunk, or payload information 1510-1 and 1510-2). For example, system 1500 generates a prediction of whether the streaming file corresponds to a particular classification.

System 1500 performs feature extraction 1540-1 with respect to payload information 1515-1 obtained from the first chunk; and performs feature extraction 1540-2 with respect to payload information 1515-2 obtained from the second chunk. In response to performing feature extraction 1540-1 and 1540-2, system 1500 performs a classification 1545 of the streaming file (e.g., a prediction based on analysis of a first virtual chunk, or payload information 1515-1 and 1515-2). For example, system 1500 generates a prediction of whether the streaming file corresponds to a particular classification.

System 1500 performs feature extraction 1550-1 with respect to payload information 1520-1 obtained from the first chunk; and performs feature extraction 1550-2 with respect to payload information 1520-2 obtained from the second chunk. In response to performing feature extraction 1550-1 and 1550-2, system 1500 performs a classification 1555 of the streaming file (e.g., a prediction based on analysis of a first virtual chunk, or payload information 1520-1 and 1520-2). For example, system 1500 generates a prediction of whether the streaming file corresponds to a particular classification.

In some embodiments, system 1500 only performs classification 1545 if system 1500 does not deem the streaming file to correspond to the particular classification based on classification 1535. Similarly, system 1500 may only perform classification 1555 if system 1500 does not does not deem the streaming file to correspond to the particular classification based on classification 1545.

Figure 16:
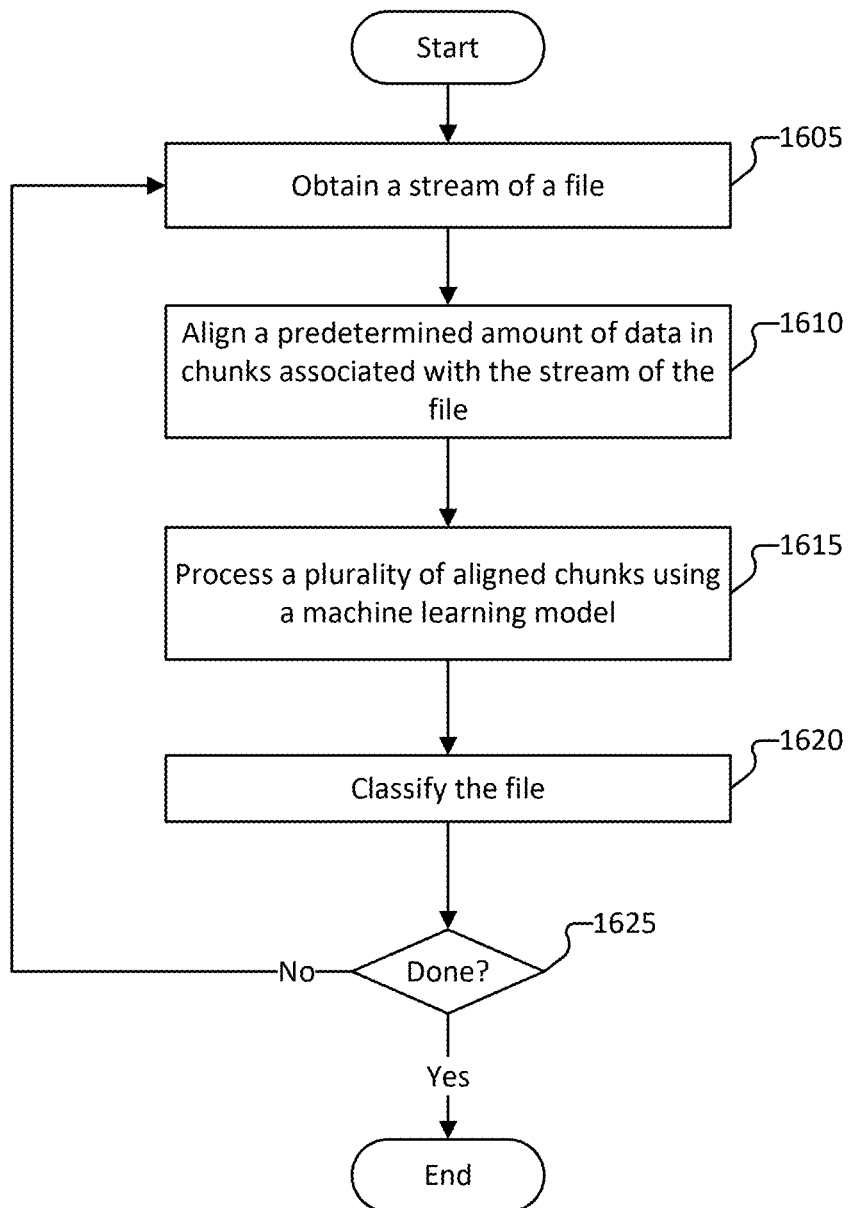
FIG. 16 is a flow diagram of a method for classifying a stream of a file according to various embodiments.

FIG. 16 is a flow diagram of a method for classifying a stream of a file according to various embodiments. In some embodiments, process 1600 is implemented at least in part by system 100 of FIG. 1 and/or system 200 of FIG. 2. Process 1600 may be implemented by an inline security entity.

At 1605, a stream of a file is obtained. The obtaining the stream of a file (e.g., a streaming file) includes successively receiving chunks for the streaming file. For example, the streaming file is obtained by an edge device.

In some embodiments, in response to receiving the first chunk of data of the streaming file, the system determines whether a chunk alignment is to be performed. For example, the system determines whether the first chunk comprises an offset (e.g., header information). The system may determine that the first chunk comprises an offset based on an analysis of the chunk, based on the file type, etc.

At 1610, the system aligns a predetermined amount of data in chunks associated with the stream of the file. In some embodiments, in response to determining an offset associated with the streaming file (e.g., extent to which payload information is offset in the chunks), the system performs a chunk alignment to account for the offset. For example, the system determines virtual chunks (also referred to herein as aligned chunks) and successively performs classification of the streaming file based on successive virtual chunks.

In some embodiments, the virtual chunk comprises a subset of bytes of a particular chunk and a subset of bytes of another chunk, such as a successive chunk. The subset of bytes of the particular chunk may be a predefined number of bytes at the end of the first chunk, and the subset of bytes in the successive chunk may be a predefined number of bytes at the beginning of the successive chunk.

At 1615, a plurality of aligned chunks are processed using a machine learning model. In some embodiments, the system performs feature extraction with respect to the aligned chunks and in response to performing the feature extraction, performs a classification for the aligned chunks.

At 1620, the file is classified. In some embodiments, the file is classified on a chunk-by-chunk basis. For example, the system classifies the file based on the processing of a particular chunk by the machine learning model. The system may sequentially classify the file as chunks are processed. In some embodiments, the system stops processing chunks of the streaming file upon the system determining that a predicted classification (based on a particular chunk) exceeds a predefined classification threshold.

At 1625, a determination is made as to whether process 1600 is complete. In some embodiments, process 1600 is determined to be complete in response to a determination that no further samples are to be analyzed (e.g., no further predictions for samples are needed), no further traffic is to be analyzed, an administrator indicates that process 1600 is to be paused or stopped, etc. In response to a determination that process 1600 is complete, process 1600 ends. In response to a determination that process 1600 is not complete, process 1600 returns to 1605.

In response to classifying the streaming file with each successive chunk, the system may determine a manner according to which the streaming file (e.g., the particular chunk(s)) are to be handled, such as whether a policy is to be enforced with respect to the streaming file.

Figure 17:
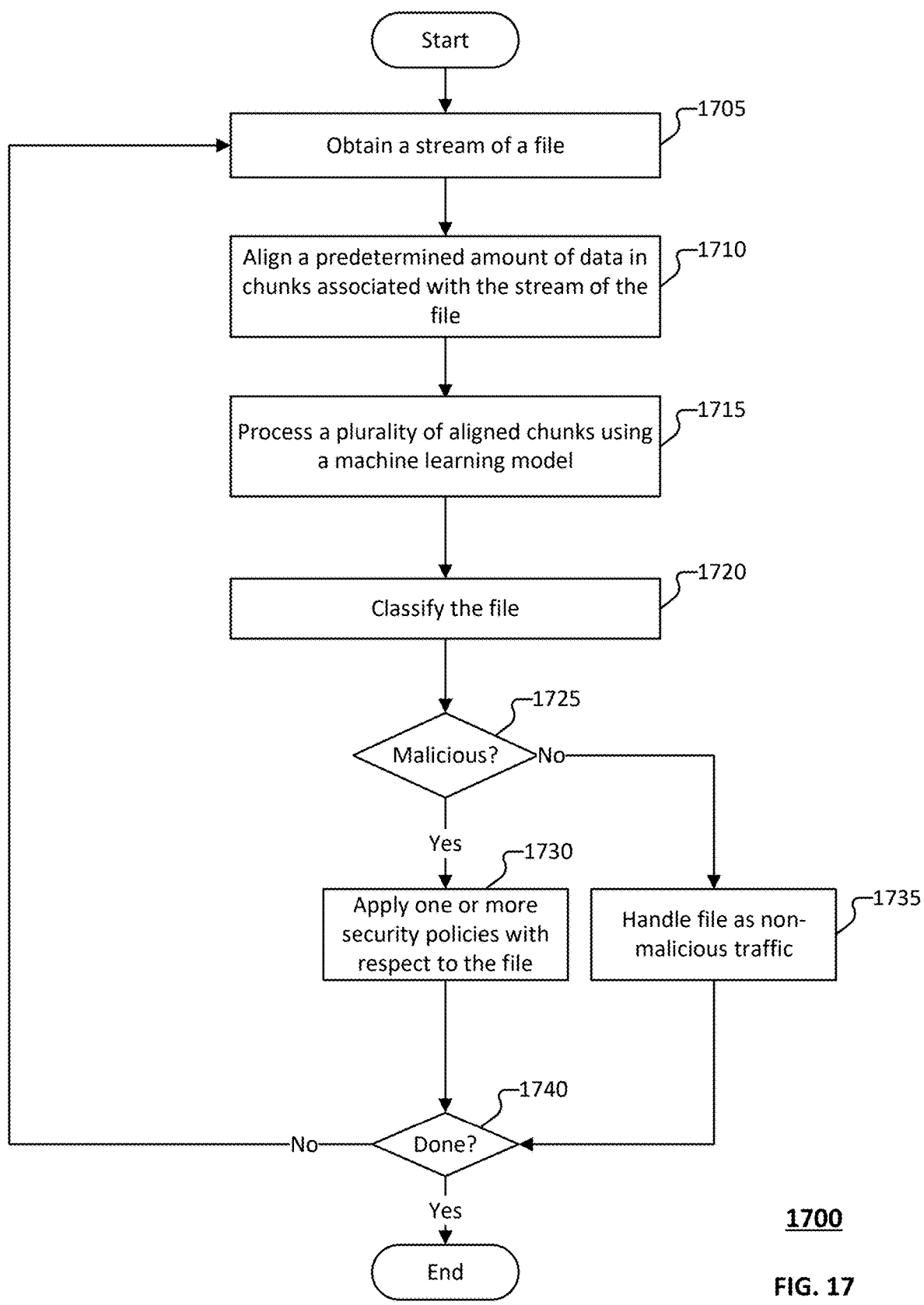
FIG. 17 is a flow diagram of a method for detecting a malicious file according to various embodiments.

FIG. 17 is a flow diagram of a method for detecting a malicious file according to various embodiments. In some embodiments, process 1700 is implemented at least in part by system 100 of FIG. 1 and/or system 200 of FIG. 2. Process 1700 may be implemented by an inline security entity.

Process 1700 is implemented to determine whether a streaming file is malicious. For example, process 1700 analyzes each successive chunk (at least until the file is deemed malicious) and classifies the file based on the analysis of the chunk(s).

At 1705, a stream of a file is obtained. In some embodiments, 1705 corresponds to, or is similar to, 1605 of process 1600.

At 1710, the system aligns a predetermined amount of data in chunks associated with the stream of the file. In some embodiments, 1710 corresponds to, or is similar to, 1610 of process 1600.

At 1715, a plurality of aligned chunks are processed using a machine learning model. In some embodiments, 1715 corresponds to, or is similar to, 1615 of process 1600.

At 1720, the file is classified. In some embodiments, the file is classified on a chunk-by-chunk basis. In some embodiments, 1720 corresponds to, or is similar to, 1620 of process 1600.

At 1725, the system determines whether the file is malicious. The system determines whether the output of comparing the prediction obtained from the model exceeds the predefined classification file is indicative of the file being malicious.

In response to determining that the file is malicious at 1725, process 1700 proceeds to 1730 at which one or more security policies are applied with respect to the file. The system may handle the malicious traffic/information based at least in part on one or more policies such as one or more security policies.

According to various embodiments, the handling of the malicious sample traffic/information may include performing an active measure. The active measure may be performed in accordance with (e.g., based at least in part on) one or more security policies. As an example, the one or more security policies may be preset by a network administrator, a customer (e.g., an organization/company) to a service that provides detection of malicious input strings or files, etc. Examples of active measures that may be performed include: isolating the sample (e.g., quarantining the sample), deleting the sample (e.g., deleting chunk data for one or more chunks), alerting the user that a malicious sample was detected, providing a prompt to a user when a device attempts to open or execute the sample, blocking transmission of the sample, updating a blacklist of malicious input strings (e.g., a mapping of a hash for the sample to an indication that the sample is malicious), etc.

In response to a determination that the traffic does not include a malicious sample at 1725, process 1700 proceeds to 1735 at which the sample (e.g., the streaming file) is handled as a non-malicious sample (e.g., non-malicious traffic/information). For example, the system may handle non-malicious samples in accordance with normal operation (e.g., permitting transmission/communication of the file, etc.).

At 1740, a determination is made as to whether process 1700 is complete. In some embodiments, process 1700 is determined to be complete in response to a determination that no further samples are to be analyzed (e.g., no further predictions for samples are needed), no further traffic is to be analyzed, an administrator indicates that process 1700 is to be paused or stopped, etc. In response to a determination that process 1700 is complete, process 1700 ends. In response to a determination that process 1700 is not complete, process 1700 returns to 1705.

Figure 18:
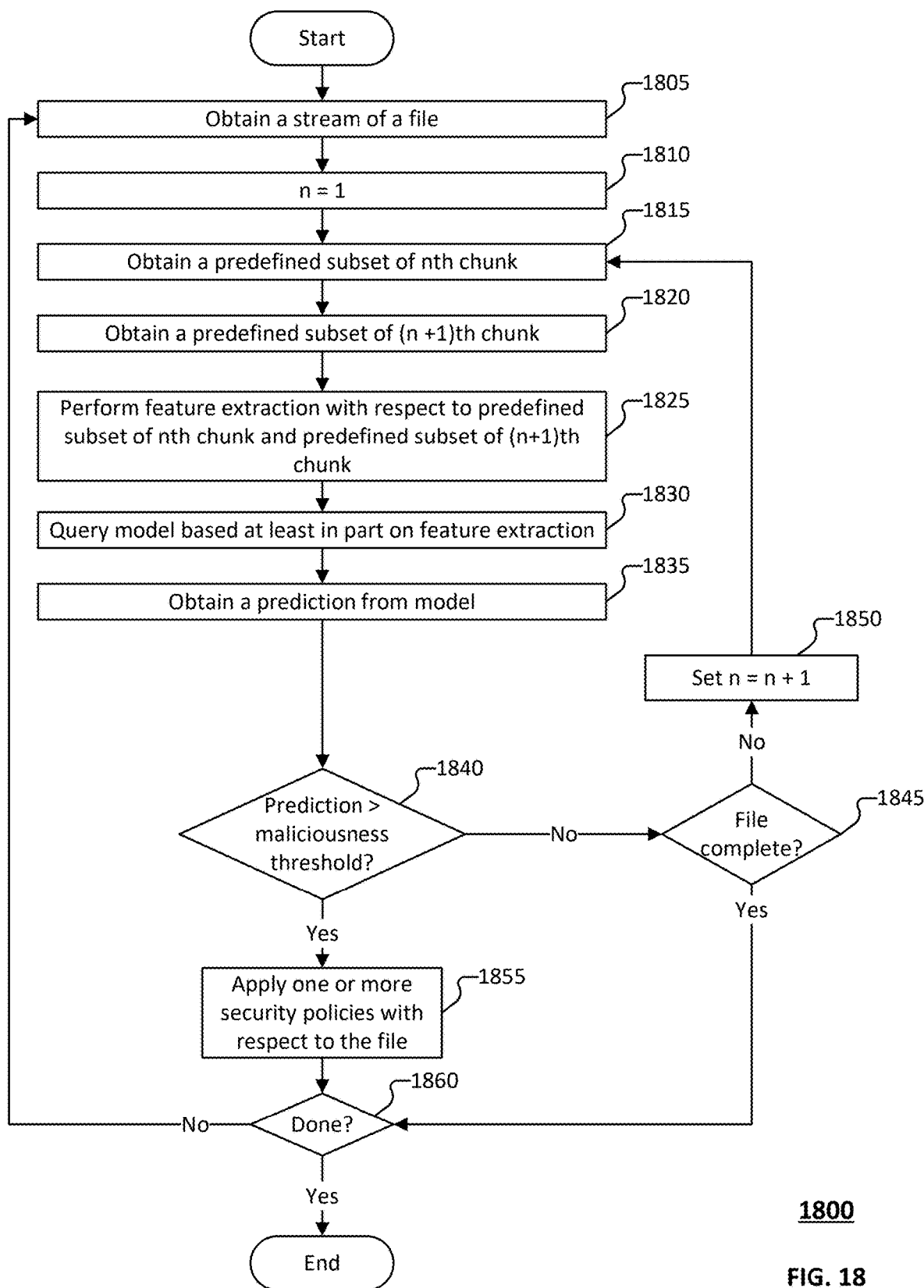
FIG. 18 is a flow diagram of a method for detecting a malicious file according to various embodiments.

FIG. 18 is a flow diagram of a method for detecting a malicious file according to various embodiments. In some embodiments, process 1800 is implemented at least in part by system 100 of FIG. 1 and/or system 200 of FIG. 2. Process 1800 may be implemented by an inline security entity.

Process 1800 is implemented to determine whether a streaming file is malicious. For example, process 1800 analyzes each successive chunk (at least until the file is deemed malicious) and classifies the file based on the analysis of the chunk(s).

Process 1800 illustrates an example in which the system determines how to handle the streaming file with each successive analysis/classification of chunks in the streaming file.

At 1805, a stream of a file is obtained. In some embodiments, 1805 corresponds to, or is similar to 1605 of process 1600.

At 1810, n is set to be equal to 1. n is a positive integer used as a counter during processing of chunks of the stream.

At 1815, a predefined subset of the nth chunk is obtained.

At 1820, a predefined subset of the (n+1)th chunk is obtained.

At 1825, feature extraction is performed with respect to the predefined subset of the nth chunk and the predefined subset of the (n+1)th chunk.

At 1830, a model is queried based on the feature extraction.

At 1835, a prediction is obtained from the model. The model may provide a predicted classification, or a likelihood that the file corresponds to a particular classification.

At 1840, the system determines whether the prediction is greater than a maliciousness threshold.

In response to determining that the prediction is greater than the maliciousness threshold at 1840, process 1800 proceeds to 1855 at which one or more security policies are applied with respect to the file (or at least any future received/processed chunks of the file). As an example, if the prediction is greater than the maliciousness threshold, the system deems the file to be malicious.

Conversely, in response to determining that the prediction is not greater than the maliciousness threshold at 1840, process 1800 proceeds to 1845 at which the system determines whether the file is complete. The system may determine whether the file is complete based on determining whether the most recent chunk processed (e.g., the (n+1)th chunk) was the last chunk of the streaming file.

In response to determining that the file is complete at 1845, process 1800 proceeds to 1860. Conversely, in response to determining that the file is not complete at 1845, process 1800 proceeds to 1850 at which n is incremented (e.g., n=n+1). Process 1800 then returns to 1815 and process 1800 iterates over 1815-1840 until processing the file is complete (e.g., a classification of the file is predicted for each chunk) or the system classifies the file as malicious based on analyzing chunk data for a particular chunk.

At 1860, a determination is made as to whether process 1800 is complete. In some embodiments, process 1800 is determined to be complete in response to a determination that no further samples are to be analyzed (e.g., no further predictions for samples are needed), no further traffic is to be analyzed, an administrator indicates that process 1800 is to be paused or stopped, etc. In response to a determination that process 1800 is complete, process 1800 ends. In response to a determination that process 1800 is not complete, process 1800 returns to 1805.

Figure 19:
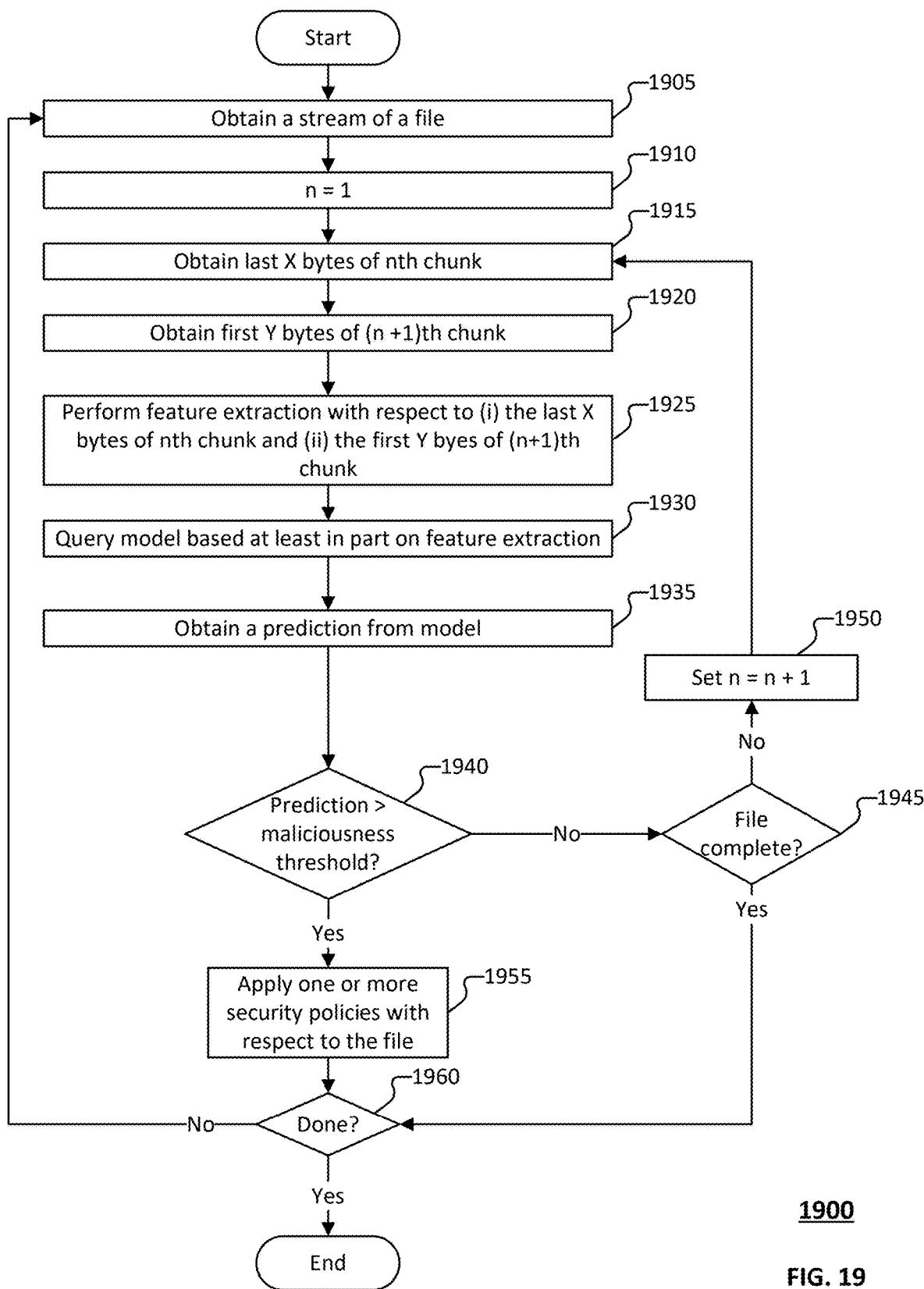
FIG. 19 is a flow diagram of a method for detecting a malicious file according to various embodiments.

FIG. 19 is a flow diagram of a method for detecting a malicious file according to various embodiments. In some embodiments, process 1900 is implemented at least in part by system 100 of FIG. 1 and/or system 200 of FIG. 2. Process 1900 may be implemented by an inline security entity.

Process 1900 is implemented to determine whether a streaming file is malicious. For example, process 1900 analyzes each successive chunk (at least until the file is deemed malicious) and classifies the file based on the analysis of the chunk(s). Although process 1900 illustrates an example for classifying whether a file is malicious, various other embodiments may be implemented to determine other classifications of the streaming file.

Process 1900 illustrates an example in which the system determines how to handle the streaming file with each successive analysis/classification of chunks in the streaming file.

At 1905, a stream of a file is obtained. In some embodiments, 1905 corresponds to, or is similar to, 1805 of process 1800.

At 1910, n is set to be equal to 1. In some embodiments, 1910 corresponds to, or is similar to, 1805 of process 1800.

At 1915, the last X bytes of the nth chunk are obtained. X is a positive integer. In some embodiments, X is predefined. In some embodiments, X is determined based on a number of byes comprised in header information for the streaming file.

At 1920, the first Y bytes of the nth chunk are obtained. Y is a positive integer. In some embodiments, Y is predefined. In some embodiments, Y is determined based on a number of byes comprised in header information for the streaming file.

At 1925, feature extraction is performed with respect to the last X bytes of the nth chunk and the first Y bytes of the (n+1)th chunk.

At 1930, a model is queried based on the feature extraction. In some embodiments, 1930 corresponds to, or is similar to, 1830 of process 1800.

At 1935, a prediction is obtained from the model. In some embodiments, 1935 corresponds to, or is similar to, 1835 of process 1800.

At 1940, the system determines whether the prediction is greater than a maliciousness threshold. In some embodiments, 1940 corresponds to, or is similar to, 1840 of process 1800.

In response to determining that the prediction is greater than the maliciousness threshold at 1940, process 1900 proceeds to 1955 at which one or more security policies are applied with respect to the file (or at least any future received/processed chunks of the file). As an example, if the prediction is greater than the maliciousness threshold, the system deems the file to be malicious.

Conversely, in response to determining that the prediction is not greater than the maliciousness threshold at 1940, process 1900 proceeds to 1945 at which the system determines whether the file is complete. The system may determine whether the file is complete based on determining whether the most recent chunk processed (e.g., the (n+1)th chunk) was the last chunk of the streaming file.

In response to determining that the file is complete at 1945, process 1900 proceeds to 1960. Conversely, in response to determining that the file is not complete at 1945, process 1900 proceeds to 1950 at which n is incremented (e.g., n=n+1). Process 1900 then returns to 1915 and process 1900 iterates over 1915-1940 until processing the file is complete (e.g., a classification of the file is predicted for each chunk) or the system classifies the file as malicious based on analyzing chunk data for a particular chunk.

At 1960, a determination is made as to whether process 1900 is complete. In some embodiments, process 1900 is determined to be complete in response to a determination that no further samples are to be analyzed (e.g., no further predictions for samples are needed), no further traffic is to be analyzed, an administrator indicates that process 1900 is to be paused or stopped, etc. In response to a determination that process 1900 is complete, process 1900 ends. In response to a determination that process 1900 is not complete, process 1900 returns to 1905.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing classification at an edge device, comprising:
   one or more processors configured to:
      obtain a stream of a file at the edge device;
      align a predetermined amount of data in chunks associated with the stream of the file, wherein aligning the predetermined amount of data in chunks associated with the stream of the file comprises:
         determining an nth file segment based at least in part on associating a predetermined amount of an ith chunk with a predetermined amount of a jth chunk, wherein i and j are positive integers, and j is greater than i;
      process a plurality of aligned chunks associated with the stream of the file using a machine learning model; and
      classify, at the edge device, the file based at least in part on a classification of the plurality of aligned chunks, wherein the file is classified based at least in part on a classification of the nth file segment; and
   a memory coupled to the one or more processors and configured to provide the one or more processors with instructions.

2. The system of claim 1, wherein the edge device is a network device.

3. The system of claim 1, wherein the edge device is an inline security entity.

4. The system of claim 1, wherein the machine learning model is configured to classify whether the file is malicious.

5. The system of claim 1, wherein the file is classified using the machine learning model before an entirety of the file is processed.

6. The system of claim 1, wherein a first chunk comprises overhead associated with the file.

7. The system of claim 1, wherein:
   determining an nth file segment based at least in part on associating a predetermined amount of an ith chunk with a predetermined amount of a jth chunk comprises:
      determining a first file segment based at least in part on associating a predetermined amount of a first chunk with a predetermined amount of a second chunk;
   processing the plurality of aligned chunks comprises querying the machine learning model based on the first file segment; and
   the file is classified based at least in part on a classification of the first file segment.

8. The system of claim 1, wherein:
   processing the plurality of aligned chunks comprises querying the machine learning model based on the nth file segment.

9. The system of claim 8, wherein the nth file segment comprises a predetermined number of bytes.

10. The system of claim 8, wherein the nth file segment comprises 1500 bytes.

11. The system of claim 8, wherein the one or more processors are configured to select the predetermined number of bytes from among a set of preset numbers of bytes, the predetermined number of bytes being selected based on a packet size of the file.

12. The system of claim 1, wherein the aligning the predetermined amount of data in chunks adjusts for file overhead in a first chunk and ensures that classification comprises processing a same number of bytes of the file for each alignment-adjusted chunk.

13. The system of claim 1, wherein using the machine learning model to classify the file based on a predefined number of bytes is deterministic.

14. The system of claim 1, wherein the file is determined to be malicious if a prediction obtained from the machine learning model exceeds a predefined malicious threshold.

15. The system of claim 14, wherein the file is determined to be malicious after an nth file segment is processed using the machine learning model, n corresponding to a positive integer that is less than a total number of chunks in the file.

16. The system of claim 14, wherein the predefined malicious threshold is constant for each file segment in the file.

17. The system of claim 14, wherein the predefined malicious threshold is dynamic across classification of file segment in the file.

18. The system of claim 14, wherein in response to determining that the file is malicious, an active measure for malicious files is implemented.

19. The system of claim 1, wherein the machine learning model is trained using a deep learning process.

20. The system of claim 15, wherein the deep learning process comprises a convolutional neural network.

21. The system of claim 20, wherein the convolutional neural network uses a kernel size less than 12.

22. The system of claim 20, wherein the convolutional neural network uses a kernel size of 8.

23. The system of claim 1, wherein a number of characters for which state information is stored for evaluation of aligned chunks is based at least in part on a kernel size of the convolutional neural network.

24. The system of claim 1, wherein the machine learning model is an XGBoost model.

25. A method for performing classification at an edge device, comprising:
- obtaining, by one or more processors, a stream of a file at the edge device;
- aligning a predetermined amount of data in chunks associated with the stream of the file, wherein aligning the predetermined amount of data in chunks associated with the stream of the file comprises:
  - determining an nth file segment based at least in part on associating a predetermined amount of an ith chunk with a predetermined amount of a jth chunk, wherein i and j are positive integers, and j is greater than i;
- processing a plurality of aligned chunks associated with the stream of the file using a machine learning model; and
- classifying, at the edge device, the file based at least in part on a classification of the plurality of aligned chunks, wherein the file is classified based at least in part on a classification of the nth file segment.

26. A computer program product embodied in a non-transitory computer readable medium for performing classification at an edge device, and the computer program product comprising computer instructions for:
- obtaining, by one or more processors, a stream of a file at the edge device;
- aligning a predetermined amount of data in chunks associated with the stream of the file, wherein aligning the predetermined amount of data in chunks associated with the stream of the file comprises:
  - determining an nth file segment based at least in part on associating a predetermined amount of an ith chunk with a predetermined amount of a jth chunk, wherein i and j are positive integers, and j is greater than i;
- processing a plurality of aligned chunks associated with the stream of the file using a machine learning model; and
- classifying, at the edge device, the file based at least in part on a classification of the plurality of aligned chunks, wherein the file is classified based at least in part on a classification of the nth file segment.

27. The system of claim 1, wherein the predetermined amount of data is aligned in chunks associated with the stream of the file based at least in part on a predefined chunk size and a file segment size for segments of the stream of the file.

* * * * *